US008855981B2

(12) United States Patent
Orofino, II et al.

(10) Patent No.: US 8,855,981 B2
(45) Date of Patent: *Oct. 7, 2014

(54) TOOLS FOR SYSTEM-LEVEL DESIGN ENVIRONMENTS

(75) Inventors: Donald Paul Orofino, II, Sudbury, MA (US); Ramamurthy Mani, Needham, MA (US); Howard Taitel, Sudbury, MA (US); John Ciolfi, Wellesley, MA (US)

(73) Assignee: The MathWorks, Inc., Natick, MA (US)

( * ) Notice: Subject to any disclaimer, the term of this patent is extended or adjusted under 35 U.S.C. 154(b) by 732 days.

This patent is subject to a terminal disclaimer.

(21) Appl. No.: 11/011,298

(22) Filed: Dec. 13, 2004

(65) Prior Publication Data

US 2006/0129371 A1 Jun. 15, 2006

(51) Int. Cl.
*G06G 7/48* (2006.01)
*G06F 3/00* (2006.01)
*G06F 9/44* (2006.01)

(52) U.S. Cl.
CPC ... *G06F 8/34* (2013.01); *G06F 3/00* (2013.01)
USPC .................................. 703/6; 703/22; 719/328

(58) Field of Classification Search
None
See application file for complete search history.

(56) References Cited

U.S. PATENT DOCUMENTS

| | | | |
|---|---|---|---|
| 5,061,245 A | 10/1991 | Waldvogel | |
| 5,331,111 A * | 7/1994 | O'Connell | 84/602 |
| 5,946,485 A | 8/1999 | Weeren et al. | |
| 6,064,409 A * | 5/2000 | Thomsen et al. | 715/700 |
| 6,226,787 B1 * | 5/2001 | Serra et al. | 717/125 |
| 6,282,699 B1 * | 8/2001 | Zhang et al. | 717/109 |
| 6,330,356 B1 | 12/2001 | Sundareswaran et al. | |
| 6,335,741 B1 * | 1/2002 | Nock | 715/764 |
| 6,412,106 B1 * | 6/2002 | Leask et al. | 717/124 |
| 6,715,139 B1 * | 3/2004 | Kodosky et al. | 717/125 |
| 6,748,583 B2 * | 6/2004 | Aizenbud-Reshef et al. | 717/127 |
| 6,817,010 B2 | 11/2004 | Aizenbud-Reshef et al. | |
| 6,839,894 B1 * | 1/2005 | Joshi et al. | 717/130 |
| 6,971,065 B2 * | 11/2005 | Austin | 715/763 |
| 6,988,262 B1 | 1/2006 | Mallory et al. | |
| 7,051,322 B2 * | 5/2006 | Rioux | 717/143 |
| 7,058,950 B2 | 6/2006 | Jeyaraman | |
| 7,062,779 B1 * | 6/2006 | Courtney et al. | 725/142 |
| 7,072,801 B2 | 7/2006 | James | |
| 7,072,813 B2 | 7/2006 | Billemaz et al. | |
| 7,076,740 B2 * | 7/2006 | Santori et al. | 715/771 |

(Continued)

FOREIGN PATENT DOCUMENTS

WO WO-99/09473 A1 2/1999

OTHER PUBLICATIONS

RedHawk NightStar Tools, Version 1.1 Release Notes, Sep. 2002.*
LabVIEW User Manual, 1996 National Instruments Cooperation.*

(Continued)

*Primary Examiner* — Kamini S Shah
*Assistant Examiner* — Kibrom Gebresilassie
(74) *Attorney, Agent, or Firm* — Harrity & Harrity, LLP

(57) ABSTRACT

Remote auxiliary tools are provided for non-intrusively and synchronously interacting with graphical models. The remote auxiliary tools are non-intrusively connected to the graphical model without requiring the addition of components to the model definition. The remote auxiliary tool can operate in an observer mode, a bypass mode, and/or a generator mode. In these modes, the remote auxiliary tool can synchronously read, modify, and/or generate data, respectively, in response to events within the executing block diagram.

60 Claims, 12 Drawing Sheets

(56) References Cited

U.S. PATENT DOCUMENTS

| | | | |
|---|---|---|---|
| 7,134,090 B2* | 11/2006 | Kodosky et al. | 715/769 |
| 7,171,653 B2 | 1/2007 | Albrecht | |
| 7,185,315 B2* | 2/2007 | Sharp et al. | 717/109 |
| 7,200,838 B2* | 4/2007 | Kodosky et al. | 717/116 |
| 7,210,105 B2 | 4/2007 | Melamed et al. | |
| 7,210,117 B2* | 4/2007 | Kudukoli et al. | 717/100 |
| 7,215,270 B1 | 5/2007 | Kozak et al. | |
| 7,302,675 B2 | 11/2007 | Rogers et al. | |
| 7,302,676 B2 | 11/2007 | Schmitt et al. | |
| 7,315,791 B2* | 1/2008 | Ilic et al. | 702/125 |
| 7,325,210 B2 | 1/2008 | Rao et al. | |
| 7,340,747 B1* | 3/2008 | Zeliger et al. | 719/328 |
| 7,439,891 B2 | 10/2008 | Kozak et al. | |
| 7,480,906 B2* | 1/2009 | Joffrain et al. | 717/171 |
| 7,490,029 B2 | 2/2009 | Wasynczuk et al. | |
| 7,512,931 B2 | 3/2009 | Schmit | |
| 7,568,017 B2* | 7/2009 | Shah et al. | 709/221 |
| 7,813,825 B2 | 10/2010 | Dubowsky | |
| 7,827,068 B2* | 11/2010 | Shah et al. | 705/26.1 |
| 7,835,895 B1 | 11/2010 | Orofino et al. | |
| 7,904,876 B1* | 3/2011 | Critz | 717/104 |
| 7,966,562 B1* | 6/2011 | Brewton et al. | 715/705 |
| 7,996,513 B2 | 8/2011 | Gorman et al. | |
| 8,046,708 B1 | 10/2011 | Aldrich | |
| 8,336,030 B1* | 12/2012 | Boissy | 717/126 |
| 8,423,326 B1 | 4/2013 | Astolfi et al. | |
| 2002/0049934 A1 | 4/2002 | Anderson et al. | |
| 2002/0052725 A1* | 5/2002 | Wasynczuk et al. | 703/22 |
| 2002/0054101 A1 | 5/2002 | Beatty | |
| 2002/0070968 A1* | 6/2002 | Austin et al. | 345/764 |
| 2002/0143857 A1 | 10/2002 | Bidarahalli et al. | |
| 2003/0005180 A1 | 1/2003 | Schmit et al. | |
| 2003/0016206 A1 | 1/2003 | Taitel | |
| 2003/0037322 A1 | 2/2003 | Kodosky et al. | |
| 2003/0046663 A1* | 3/2003 | Rogers et al. | 717/125 |
| 2003/0084127 A1* | 5/2003 | Budhiraja et al. | 709/220 |
| 2003/0093239 A1* | 5/2003 | Schmit | 702/127 |
| 2003/0107595 A1 | 6/2003 | Ciolfi | |
| 2003/0200076 A1* | 10/2003 | Kodosky et al. | 703/22 |
| 2004/0031019 A1* | 2/2004 | Lamanna et al. | 717/125 |
| 2004/0032429 A1 | 2/2004 | Shah et al. | |
| 2004/0034696 A1* | 2/2004 | Joffrain et al. | 709/217 |
| 2004/0045009 A1* | 3/2004 | Bryant | 719/316 |
| 2004/0064750 A1* | 4/2004 | Conway | 713/401 |
| 2004/0093197 A1* | 5/2004 | Billemaz et al. | 703/13 |
| 2004/0153997 A1 | 8/2004 | Anderson et al. | |
| 2004/0205726 A1 | 10/2004 | Chedgey et al. | |
| 2004/0210426 A1 | 10/2004 | Wood | |
| 2004/0210798 A1* | 10/2004 | Higashi | 714/27 |
| 2004/0255269 A1* | 12/2004 | Santori et al. | 717/109 |
| 2005/0144587 A1 | 6/2005 | Bryant | |
| 2005/0183098 A1* | 8/2005 | Ilic et al. | 719/328 |
| 2006/0041859 A1* | 2/2006 | Vrancic et al. | 717/105 |
| 2006/0053211 A1* | 3/2006 | Kornerup et al. | 709/217 |
| 2006/0064670 A1* | 3/2006 | Linebarger et al. | 717/106 |
| 2006/0111074 A1 | 5/2006 | Petilli et al. | |
| 2006/0129371 A1 | 6/2006 | Orofino et al. | |
| 2006/0184410 A1 | 8/2006 | Ramamurthy et al. | |
| 2006/0259870 A1 | 11/2006 | Hewitt et al. | |
| 2007/0143455 A1 | 6/2007 | Gorman et al. | |
| 2008/0007332 A1 | 1/2008 | Dubowsky | |
| 2008/0028196 A1 | 1/2008 | Kailas | |
| 2008/0098349 A1* | 4/2008 | Lin et al. | 717/106 |
| 2008/0222620 A1 | 9/2008 | Little et al. | |
| 2009/0012757 A1 | 1/2009 | Orofino et al. | |
| 2009/0132993 A1 | 5/2009 | Mani et al. | |
| 2009/0216546 A1 | 8/2009 | Huang et al. | |
| 2010/0223564 A1 | 9/2010 | Hsu et al. | |
| 2011/0023019 A1 | 1/2011 | Aniszczyk et al. | |
| 2011/0214044 A1 | 9/2011 | Davis et al. | |
| 2012/0066762 A1 | 3/2012 | Todorovic | |
| 2012/0089987 A1* | 4/2012 | Hulick, Jr. | 719/312 |
| 2013/0198527 A1 | 8/2013 | Lu et al. | |
| 2014/0053090 A1 | 2/2014 | Lu et al. | |
| 2014/0059525 A1 | 2/2014 | Jawa et al. | |
| 2014/0059573 A1 | 2/2014 | Jawa et al. | |

OTHER PUBLICATIONS

International Search Report for PCT/US2005/045493, dated Apr. 25, 2007.

Summons to Attend Oral Proceedings for Application No. 05854256. 4, 14 pages, dated Nov. 28, 2012.

Concurrent Computer Corporation, "NightSim User's Guide," 136 pages, (2002).

Concurrent Computer Corporation, "RedHawk Linux, Real-Time Software Environment," 2 pages (2002).

Mansor, Wahidah et al., "Software Methodology for Remote Monitoring and Control System," Proceedings of TENCON, vol. 3:509-511 (2000).

National Instruments, "LabVIEW, User Manual," 514 pages, (1998).

The MathWorks, "Simulink, Model-Based and System-Based Design," Using Simulink, Version 5, 476 pages (2002).

* cited by examiner

TOOLS FOR SYSTEM-LEVEL DESIGN ENVIRONMENTS

FIELD OF THE INVENTION

The present invention relates to a system and method suitable for non-intrusively observing, modifying, and/or generating data synchronous with events in an executing block diagram or graphical model.

BACKGROUND OF THE INVENTION

Historically, engineers and scientists have utilized graphical models in numerous scientific areas such as Feedback Control Theory and Signal Processing to study, design, debug, and refine dynamic systems. Dynamic systems, which are characterized by the fact that their behaviors change over time, are representative of many real-world systems. Graphical modeling has become particularly attractive over the last few years with the advent of software packages, such as Simulink®, made by The MathWorks, Inc. of Natick Mass., LabVIEW®, made by National Instruments Corporation of Austin, Tex., and the like. Simulink® provides sophisticated software platforms with a rich suite of support tools that makes the analysis and design of dynamic systems efficient, methodical, and cost-effective.

A dynamic system (either natural or man-made) is a system whose response at any given time is a function of its input stimuli, its current state, and the current time. Such systems range from simple to highly complex systems. Physical dynamic systems include a falling body, the rotation of the earth, bio-mechanical systems (muscles, joints, etc.), biochemical systems (gene expression, protein pathways), weather and climate pattern systems, etc. Examples of man-made or engineered dynamic systems include: a bouncing ball, a spring with a mass tied on an end, automobiles, airplanes, control systems in major appliances, communication networks, audio signal processing, nuclear reactors, a stock market, etc.

Professionals from diverse areas such as engineering, science, education, and economics build mathematical models of dynamic systems in order to better understand system behavior as it changes with the progression of time. The mathematical models aid in building "better" systems, where "better" may be defined in terms of a variety of performance measures such as quality, time-to-market, cost, speed, size, power consumption, robustness, etc. The mathematical models also aid in analyzing, debugging and repairing existing systems (be it the human body or the anti-lock braking system in a car). The models may also serve an educational purpose of educating others on the basic principles governing physical systems. The models and results are often used as a scientific communication medium between humans. The term "model-based design" is used to refer to the use of graphical models in the development, analysis, and validation of dynamic systems.

Dynamic systems are typically modeled in model environments as sets of differential, difference, and/or algebraic equations. At any given instant of time, these equations may be viewed as relationships between the system's output response ("outputs"), the system's input stimuli ("inputs") at that time, the current state of the system, the system parameters, and time. The state of the system may be thought of as a numerical representation of the dynamically changing configuration of the system. For instance, in a physical system modeling a simple pendulum, the state may be viewed as the current position and velocity of the pendulum. Similarly, a signal-processing system that filters a signal would maintain a set of previous inputs as the state. The system parameters are the numerical representation of the static (unchanging) configuration of the system and may be viewed as constant coefficients in the system's equations. For the pendulum example, a parameter is the length of pendulum and for the filter example; a parameter is the values of the filter taps.

Generally, graphical analysis and modeling methods, such as the block diagram method, are used in modeling for design, analysis, and synthesis of engineered systems. The visual representation allows for a convenient interpretation of model components and structure and provides a quick intuitive notion of system behavior.

During the course of modeling and simulation, it is often desirable to be able to observe particular data values at certain locations of the model, or to observe how data is transformed through the model. Examples of such data values include signal values, states, work areas, and parameters. Signal displays used in conjunction with a system-level design environment, such as Simulink®, often require multiple display mechanisms to be associated simultaneously with multiple signals to monitor the progress of a model at various points of interest. Currently, block diagram environments offer "scope" blocks to be used in such situations, with each scope connected to a signal of interest in the model. Alternatively, environments such as Real-Time Workshop® (manufactured by The MathWorks, Inc. of Natick Mass.) offer interfaces to various data values of the model, such that an individual can non-intrusively observe the data values.

However, conventional non-intrusive approaches to observing the various data elements do not allow users to observe the data synchronously with the various execution events in the block-diagram or other operating model. Such synchrony is critical in many scenarios because data values may be not be in a deterministic observable state at all times during model execution. An example of such a scenario is when a signal memory location is reused by multiple blocks for efficiency reasons. Furthermore, allowing synchronous observation of the data also ensures that observers of the data are operating optimally, for example when the data values are refreshed.

During the course of modeling, it is also often desirable to bypass or generate data values to aid in refining or debugging a design. For example, one could generate various inputs at a particular point in the block-diagram model based on various test scenarios. In another example, one could bypass the signal values written by a block to remove the transformation performed by a block during a debugging task. In conventional applications, such as Simulink®, one needs to intrusively insert blocks and/or lines into the graphical model to achieve bypass or signal generation. It should be noted that these intrusive means of bypass or generation result in the operations being synchronous with the execution of the block-diagram. However, conventional graphical modeling design environments do not offer mechanisms for non-intrusive, yet synchronous bypass or generation of data values.

SUMMARY OF THE INVENTION

There is a need in the art for a design tool that interacts with an executing model in a manner that is non-intrusive, but also synchronized with the model as the model executes. The interaction can be decoupled from the model as a remote auxiliary tool, which can observe, modify, and/or generate data from or for the model as it executes. The present invention is directed toward further solutions that address this need.

In accordance with various aspects of the present invention, the at least one remote auxiliary tool can be an observation tool. The observation tool can non-intrusively collect data after attachment to the model. The observation tool can non-intrusively register interest in at least one of data and an execution event of the model. The observation tool can initiate an action upon occurrence of a predetermined execution event of the model. The observation tool can non-intrusively register interest in the at least one of data and an event of the model upon occurrence of a condition. The observation tool can access at least one of data and an event of the model using one of block diagram primitives and textual language primitives. The observation tool can choose to block or prevent block-diagram execution during the process of observing the data. The observation tool can choose to allow block-diagram execution during the process of observing the data.

In accordance with further aspects of the present invention, the at least one remote auxiliary tool can alternatively be a bypass tool. The bypass tool can non-intrusively access and modify at least one of data and an event of the model. The bypass tool can non-intrusively register interest in at least one of data and an execution event of the model. The bypass tool can initiate an action upon occurrence of a predetermined execution event of the model. The bypass tool can non-intrusively register interest in the at least one of data and an event of the model upon occurrence of a condition. The bypass tool can additionally return a modified form of the at least one of data and an event. The bypass tool can access and modify at least one of data and an event of the model using one of block diagram primitives and textual language primitives. The bypass tool can access and modify at least one of data and an event of the model and forward a modified form of the at least one of data and an event to a location distinct from the model.

In accordance with further aspects of the present invention, the at least one remote auxiliary tool can alternatively be a generator tool. The generator tool can generate at least one of data and an event of the model. The generator tool can non-intrusively register interest in at least one of data and an execution event of the model. The generator tool can initiate an action upon occurrence of a predetermined execution event of the model. The generator tool can non-intrusively register interest in the at least one of data and an event of the model upon occurrence of a condition. The generator tool can generate at least one of data and an event of the model using one of block diagram primitives and textual language primitives.

In accordance with further aspects of the present invention, the remote auxiliary tool can be an observation tool, a bypass tool, and a generator tool. The remote auxiliary tool can be saved in the model. The remote auxiliary tool can be saved separate from the model. An identifier relating to the remote auxiliary tool can be saved in the model.

In accordance with one embodiment of the present invention, in a graphical modeling environment operating on an electronic device, a method of using a remote auxiliary tool includes connecting it to the graphical modeling environment prior to execution, during execution, or after execution of a model. The method continues with operating the at least one remote auxiliary tool to effect a desired result. The remote auxiliary tool is detachable from the model during execution of the model in the graphical modeling environment.

In accordance with further aspects of the present invention, the at least one remote auxiliary tool can be an observation tool. The observation tool can non-intrusively collect data after attachment to the model. The observation tool can non-intrusively register interest in at least one of data and an execution event of the model. The observation tool can initiate an action upon occurrence of a predetermined execution event of the model. The observation tool can non-intrusively register interest in the at least one of data and an event of the model upon occurrence of a condition. The observation tool can access at least one of data and an event of the model using one of block diagram primitives and textual language primitives. The observation tool can choose to block or prevent block-diagram execution during the process of observing the data. The observation tool can choose to allow block-diagram execution during the process of observing the data.

In accordance with further aspects of the present invention, the at least one remote auxiliary tool can be a bypass tool. The bypass tool can non-intrusively access and modify at least one of data and an event of the model. The bypass tool can non-intrusively register interest in at least one of data and an execution event of the model. The bypass tool can initiate an action upon occurrence of a predetermined execution event of the model. The bypass tool can non-intrusively register interest in the at least one of data and an event of the model upon occurrence of a condition. The bypass tool can additionally return a modified form of the at least one of data and an event. The bypass tool can access and modify at least one of data and an event of the model using one of block diagram primitives and textual language primitives. The bypass tool can access and modify at least one of data and an event of the model and forward a modified form of the at least one of data and an event to a location distinct from the model.

In accordance with further aspects of the present invention, the at least one remote auxiliary tool can alternatively be a generator tool. The generator tool can generate at least one of data and an event of the model. The generator tool can non-intrusively register interest in at least one of data and an execution event of the model. The generator tool can initiate an action upon occurrence of a predetermined execution event of the model. The generator tool can non-intrusively register interest in the at least one of data and an event of the model upon occurrence of a condition. The generator tool can generate at least one of data and an event of the model using one of block diagram primitives and textual language primitives.

In accordance with one embodiment of the present invention, a medium is provided for use in a graphical modeling environment on an electronic device. The medium holds instructions executable using the electronic device for performing a method of using a remote auxiliary tool. The method includes connecting at least one remote auxiliary tool to the graphical modeling environment prior to execution, during execution, or after execution of a model. The method continues with operating the at least one remote auxiliary tool to effect a desired result. The remote auxiliary tool is detachable from the model during execution of the model in the graphical modeling environment.

In accordance with another embodiment of the present invention, in a graphical modeling environment, a remote auxiliary tool includes at least one observation tool for non-invasively accessing data in a model. The remote auxiliary tool can be connected to the graphical modeling environment one of prior to execution, during execution, and after execution of the model. The remote auxiliary tool is detachable from the model during execution of the model in the graphical modeling environment.

In accordance with another embodiment of the present invention, in a graphical modeling environment, a remote auxiliary tool is provided that includes at least one bypass tool for accessing data in a model. The remote auxiliary tool can be connected to the graphical modeling environment prior to execution, during execution, or after execution of the model.

The remote auxiliary tool is detachable from the model during execution of the model in the graphical modeling environment.

In accordance with another embodiment of the present invention, in a graphical modeling environment, a remote auxiliary tool is provided that includes at least one generator tool for generating data or events in a model. The remote auxiliary tool can be connected to the graphical modeling environment prior to execution, during execution, or after execution of the model. The remote auxiliary tool is detachable from then model during execution of the model in the graphical modeling environment.

In accordance with another embodiment of the present invention, in a graphical modeling environment, a method of using a remote auxiliary tool on an electronic device is provided. The method includes connecting at least one observation tool to the graphical modeling environment prior to execution, during execution, or after execution of a model. The at least one observation tool is operated to effect a desired result. The remote auxiliary tool is detachable from the model during execution of the model in the graphical modeling environment.

In accordance with another example embodiment of the present invention, in a graphical modeling environment, a method of using a remote auxiliary tool on an electronic device is provided. The method includes connecting the at least one bypass tool to the graphical modeling environment prior to execution, during execution, or after execution of a model. The at least one bypass tool can be operated to effect a desired result. The remote auxiliary tool is detachable from the model during execution of the model in the graphical modeling environment.

In accordance with another example embodiment of the present invention, in a graphical modeling environment, a method of using a remote auxiliary tool on an electronic device is provided. The method includes connecting the at least one generator tool to the graphical modeling environment prior to execution, during execution, or after execution of a model. The at least one generator tool can be operated to effect a desired result. The remote auxiliary tool is detachable from the model during execution of the model in the graphical modeling environment.

In accordance with another example embodiment of the present invention, a medium for use in a graphical modeling environment on an electronic device is provided. The medium holds instructions executable using the electronic device for performing a method of using a remote auxiliary tool. The method includes connecting the at least one observation tool to the graphical modeling environment prior to execution, during execution, or after execution of a model. The at least one observation tool can be operated to effect a desired result. The remote auxiliary tool is detachable from the model during execution of the model in the graphical modeling environment.

In accordance with another example embodiment of the present invention, a medium for use in a graphical modeling environment on an electronic device is provided. The medium holds instructions executable using the electronic device for performing a method of using a remote auxiliary tool. The method includes connecting the at least one bypass tool to the graphical modeling environment prior to execution, during execution, or after execution of a model. The at least one bypass tool is operated to effect a desired result. The remote auxiliary tool is detachable from the model during execution of the model in the graphical modeling environment.

In accordance with another example embodiment of the present invention, a medium for use in a graphical modeling environment on an electronic device is provided. The medium holds instructions executable using the electronic device for performing a method of using a remote auxiliary tool. The method includes connecting the at least one generator tool to the graphical modeling environment prior to execution, during execution, or after execution of a model. The at least one generator tool is operated to effect a desired result. The remote auxiliary tool is detachable from the model during execution of the model in the graphical modeling environment.

In accordance with one example embodiment of the present invention, the at least one remote auxiliary tool can be implemented using block diagram primitives. These primitives are aggregated into the block-diagram automatically prior to execution by the modeling environment.

In accordance with one example embodiment of the present invention, the at least one remote auxiliary tool can be implemented as an event-listener application programming interface (API). This API can provide a non-intrusive and synchronized interface to at least one observer tool, bypass tool, or a generator tool. The listener may be implemented using one of block diagram primitives and textual language primitives.

In accordance with one example embodiment of the present invention, the at least one remote auxiliary tool can be implemented as a set of callbacks. These callbacks are invoked synchronously with block-diagram execution events. The callbacks may be implemented using one of block diagram primitives and textual language primitives.

BRIEF DESCRIPTION OF THE DRAWINGS

The present invention will become better understood with reference to the following description and accompanying drawings, wherein.

DETAILED DESCRIPTION

Figure 1:
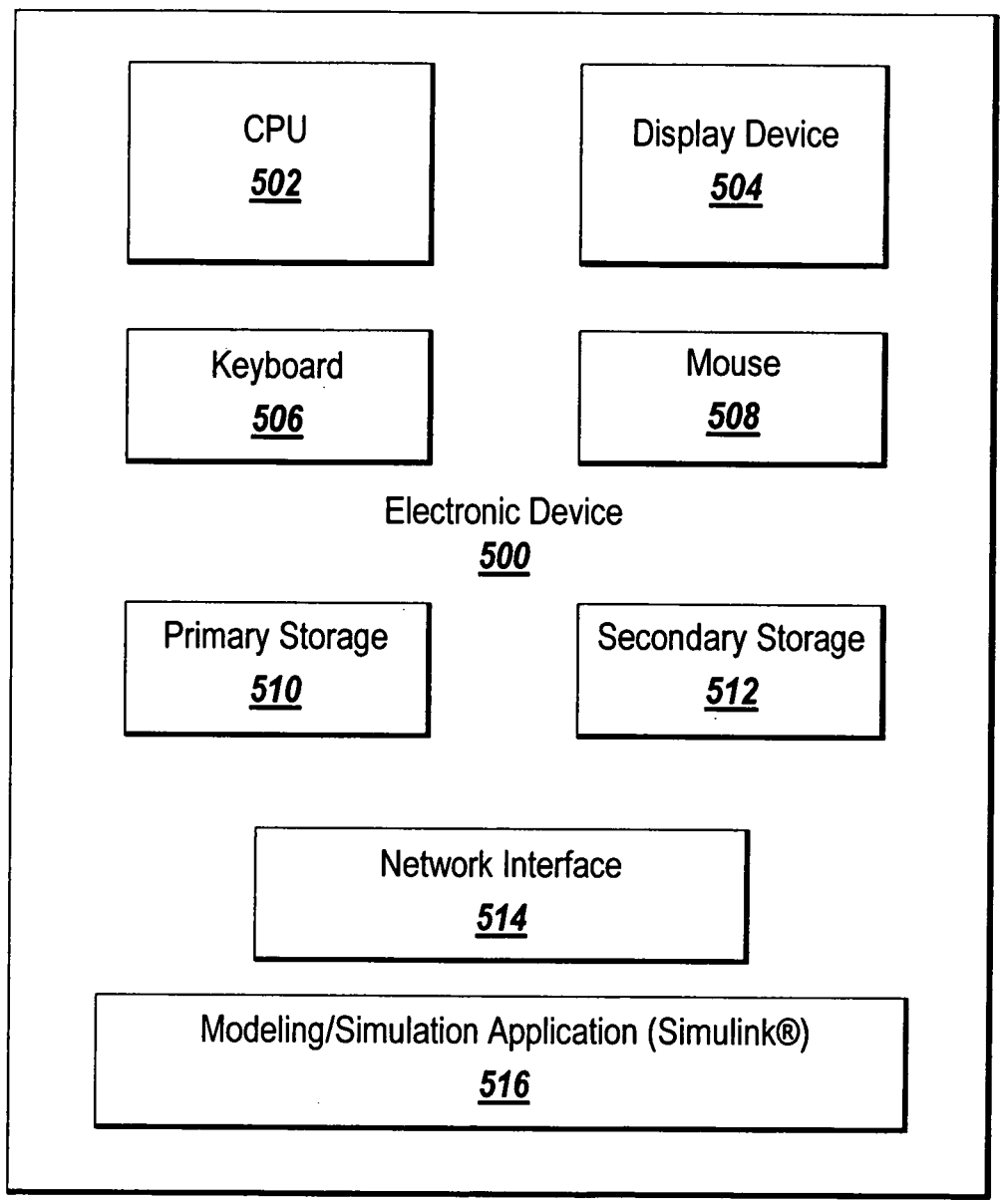
FIG. 1 is a is a diagrammatic illustration of an electronic device that can be utilized to execute a method performed in an embodiment of the present invention.

An illustrative embodiment of the present invention relates to a remote auxiliary tool and corresponding method of use. The remote auxiliary tool is formed of at least one of an observation tool, a bypass tool, and a generator tool. The remote auxiliary tool is non-intrusively and synchronously connected to a graphical modeling environment prior to execution, during execution, or after execution of a model. The remote auxiliary tool is detachable from the model during execution of the model in the graphical modeling environment.

The remote auxiliary tool is non-intrusive to the graphical model, such that the remote auxiliary tool is not embedded in the model in the same way that other elements of the model are interconnected and embedded. In the case of a graphical model using blocks and signals, the user does not add blocks or signals to the model diagram when attaching a remote auxiliary tool in accordance with the present invention to the model. Rather, the remote auxiliary tool registers interest with the model, and during execution the model informs the remote auxiliary tool of events of which the tool has requested to receive notification. The process of sending an event can be achieved through, but not limited to, an event-listener application programming interface (API), a callback based interface, and/or model and remote auxiliary tool aggregation for execution. The remote auxiliary tool can work with execution modes that include but are not limited to interpretive, accelerated, or generated code model execution modes.

FIGS. 1 through 11, wherein like parts are designated by like reference numerals throughout, illustrate example embodiments of a remote auxiliary tool, and corresponding method of use, according to the present invention. Although the present invention will be described with reference to the example embodiments illustrated in the figures, it should be understood that many alternative forms can embody the present invention. One of ordinary skill in the art will additionally appreciate different ways to alter the parameters of the embodiments disclosed in a manner still in keeping with the spirit and scope of the present invention.

FIG. 1 illustrates one example embodiment of an electronic device 500 suitable for practicing the illustrative embodiments of the present invention. The electronic device 500 is representative of a number of different technologies, such as personal computers (PCs), laptop computers, workstations, personal digital assistants (PDAs), Internet appliances, cellular telephones, and the like. In the illustrated embodiment, the electronic device 500 includes a central processing unit (CPU) 502 and a display device 504. The display device 504 enables the electronic device 500 to communicate directly with a user through a visual display. The electronic device 500 further includes a keyboard 506 and a mouse 508. Other potential input devices not depicted include a stylus, trackball, joystick, touch pad, touch screen, and the like. The electronic device 500 includes a non-transitory computer readable medium such as primary storage 510 and secondary storage 512 for storing data and instructions. The storage devices 510 and 512 can include such technologies as a floppy drive, hard drive, tape drive, optical drive, read only memory (ROM), random access memory (RAM), and the like. Applications such as browsers, JAVA virtual machines, and other utilities and applications can be resident on one or both of the storage devices 510 and 512. The electronic device 500 can also include a network interface 514 for communicating with one or more electronic devices external to the electronic device 500 depicted. A modem is one form of network interface 514 for establishing a connection with an external electronic device or network. The CPU 502 has either internally, or externally, attached thereto one or more of the aforementioned components. In addition to applications previously mentioned, modeling applications, such as Simulink® 516, can be installed and operated on the electronic device 500.

It should be noted that the electronic device 500 is merely representative of a structure for implementing the present invention. However, one of ordinary skill in the art will appreciate that the present invention is not limited to implementation on only the device 500 as described herein. Other implementations can be utilized, including an implementation based partially or entirely in embedded code, where no user inputs or display devices are necessary. Rather, a processor can communicate directly with another processor or other device.

Turning now to example embodiments of the present invention, the method and system of the present invention operate in a block diagram modeling environment, such as that of Simulink®. The block diagram modeling environment is otherwise referred to herein as the graphical model. One of ordinary skill in the art will appreciate that there are a number of different graphical modeling and simulation applications that make general use of blocks or other graphical representations to model or simulate conditions, events, designs, operations, and the like, or to model and control events implemented on hardware devices, and the like. Accordingly, the present invention is intended for use on all such modeling applications.

Figure 2A:
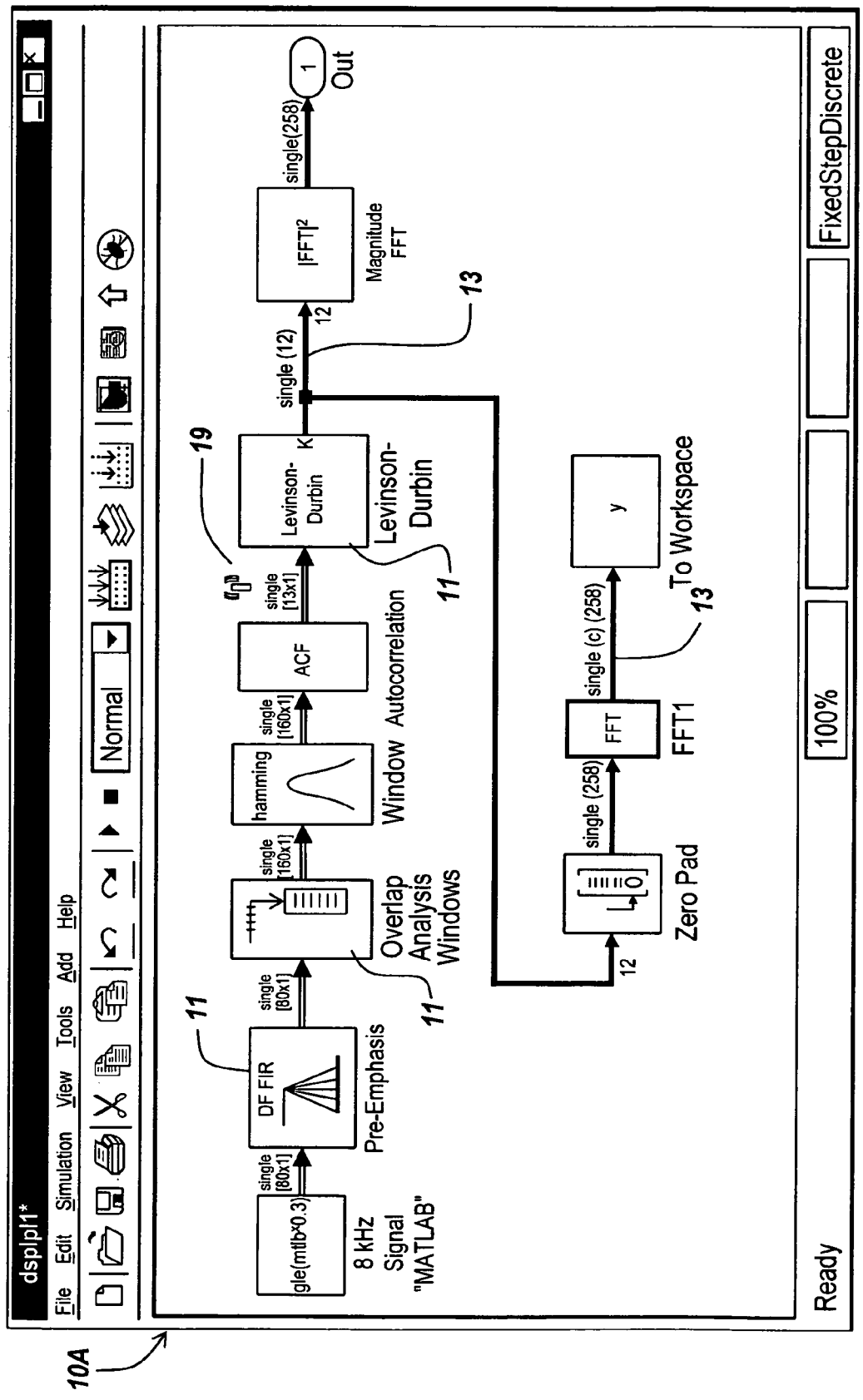
FIG. 2A is a screen depiction of an example model that can make use of the tool and method according to one aspect of the present invention.
Figure 2B:
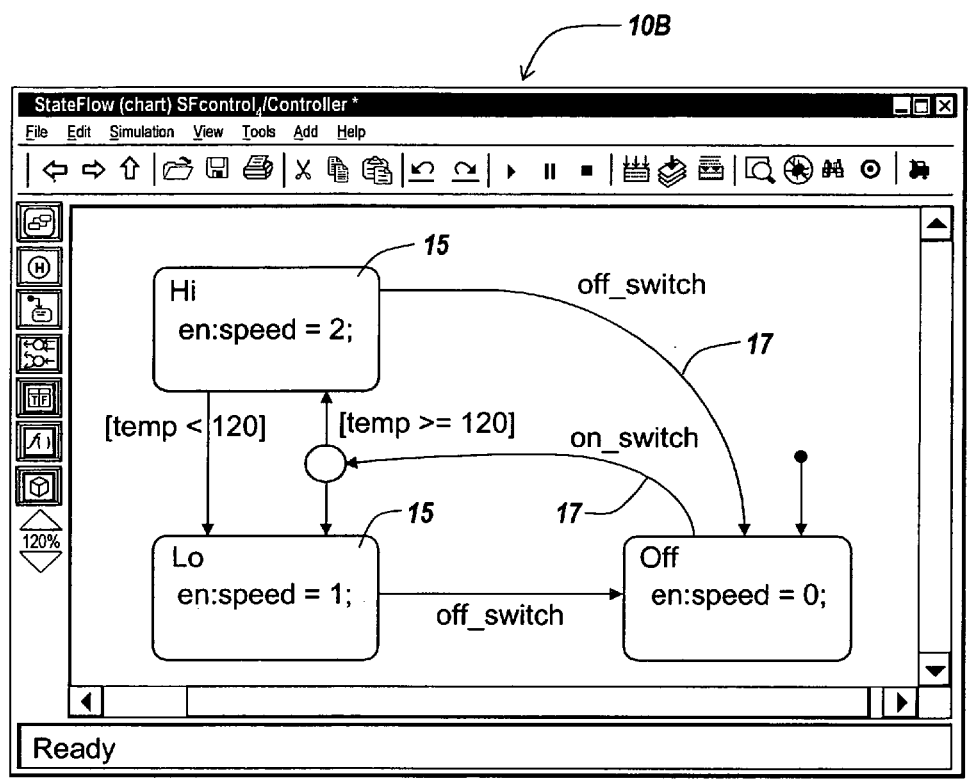
FIG. 2B is a screen depiction of an example model that can make use of the tool and method according to one aspect of the present invention.

The present invention is generally directed to a system and method for interacting non-intrusively, yet synchronously, with a graphical model. FIGS. 2A and 2B are screen depictions of a graphical model 10 simulating a dynamic process. FIG. 2A shows a version of a time-based or event-based block diagram graphical model 10A, while FIG. 2B shows a version of a state-based or event-based flow diagram graphical model 10B. As referred to herein, graphical model 10 is intended to encompass multiple variations of graphical model, including those shown in FIGS. 2A and 2B. Accordingly, graphical model 10 as utilized herein includes graphical model 10A and graphical model 10B, as well as other graphical models of dynamic systems. Graphical model 10A is formed generally of a plurality of blocks 11 that pass signals 13 to represent a dynamic system. Graphical model 10B is formed of a plurality of states 15 that communicate though blocks in the form of transitions 17. The particular use or purpose of the graphical model 10 can vary to include anything that can be modeled using a graphical modeling environment. Thus, the present invention is not limited to the specific example embodiments discussed herein, as understood by one of ordinary skill in the art.

In the example embodiment, time-based graphical models 10A have blocks connected by signals. Blocks are responsible for computing the values of signals as time progresses. The arrows denote the computational direction of the signal. Input ports read signals and output ports write signals. The user of the present invention may wish to obtain a reading of a value of one of the signals 13 in the graphical model 10, or of one of the processes in one of the blocks 11. However, in the graphical model 10 illustrated, there is no instance of a scope shown with the model. Accordingly, if the graphical model 10 is running a model execution at the time illustrated in the figure, conventional modeling applications in the situation illustrated have no mechanism for a user to be able to take readings of signal or internal block/model states synchronously.

However, with the remote auxiliary tool of the present invention in accordance with one embodiment, an event-listener API or equivalent tool is provided associating a tool with the graphical model 10 without being embedded in the graphical model 10. For example, if the user wishes to know the value of the signal at point A in the graphical model 10, the user implements the remote auxiliary tool of the present invention to initiate an observation event, or equivalent observation tool. The user registers with the model, using the event-listener API, a request to invoke an observer when point A in the graphical model 10 is computed by the source block of the signal of point A. As the model is executing, when the signal at point A is re-computed by the source block of the signal, an event is sent to the listener. The listener in this illustrative example is an observer that reads the value of the signal at point A and displays the value appropriately in a device, such as a graphical display scope. It should be noted that throughout this description the example embodiments make use of an API form of tool to connect the remote auxiliary tool to the model. However, one of ordinary skill in the art will appreciate that the remote auxiliary tool does not need to be implemented in the form of an API, but rather, can be implemented using a number of different tools, including library based modules, and other tools. As such, references to an API in the present description are intended to include APIs as well as such other equivalent tools noted above. In addition, an alternative example embodiment of the present invention makes use of an aggregation programming paradigm to achieve the non-intrusive and synchronized behavior of the remote auxiliary tool.

The remote auxiliary tool itself does not need to be represented graphically in the graphical model 10. However, because the remote auxiliary tool registers listeners with the model, the model can insert a graphical symbol or text, such as symbol 19, or other representation in the graphical model 10 showing the existence of the listener for the remote auxiliary tool. Such graphical representation can be, for example, shown in the block 11, similar to those illustrated in FIGS. 2A and 2B, indicating the remote auxiliary tool is connected to the internal state of the block 11 and not the signal 13. More specifically, in the illustrative example showing the symbol 19, connections made by the remote auxiliary tool can be described by selection of one or more signals 13 from a list of all available signals 13 in the graphical model 10. The remote auxiliary tool can also be described by the direct entry of an identification of one or more signals 13 in the graphical model 10. The connections can be highlighted at some point in time, to associate a symbol 19 with one or more selected signals 13. For example, this can be accomplished by pressing a button in the display interface, with the corresponding signal 13 in the model highlighted by color, blinking, or other temporary or persistent graphical indication, in addition to textual or other representations. The connection can also be highlighted by a graphical affordance in the graphical model 10, such as a "test point" symbol (small 'lollipop' icon) connected to a signal line for as long as the virtual connection remains. For connections to internal block state as in the illustrative block 11, the connections can be created in similar fashion to signal selection, except that a block 11 is selected.

The remote auxiliary tool can be connected to the model 10 using an event-listener API. More specifically and in accordance with an example embodiment of the present invention, the API that enables the practice of the remote auxiliary tool in accordance with the present invention, includes the presence of user-definable pre-execution and/or post-execution callbacks or events associated with any of the methods of the computational blocks in the graphical model 10, such that the callback or event enforces proper synchronization for data transfer to and from the tool. Such an API can likewise be provided where the definitions refer to data nodes in a physical hardware device, such as memory locations in a processor, a physical I/O protocol for a processor or an FPGA or ASIC, or some other defined method for data delivery, as understood by one of ordinary skill in the art. A unique identifier can be provided for each signal in the graphical model 10 or hardware, such that the tool can be associated with any signal or group of signals. Methods to read, and optionally write, signal data via the unique identifier, which can be synchronized by the pre-execution and/or post-execution callback or event, can be provided. Furthermore, textual, graphical, audio, visual, tactile, or other data rendering techniques and capabilities supported by, or interfaced to, the modeling environment can be provided, such that the signal data is presented to user in a discernable manner.

The remote auxiliary tool can include different types of observer tools, such as display scopes, strip chart recorder, an oscilloscope, a spectrum analyzer, a 2-port network analyzer, a logic signal display, a waterfall plot, a communications constellation plot, an audio output device, and a video display device. The observer tool can also be a non-graphical tool, such as a tool that reads the model data (such as the signal at point A of the illustrative model 10) and sends the data to another system for processing. The remote auxiliary tool can include different bypass tools such as a non-graphical tool that reads data from the model 10 and, if the data exceeds a specified limit, the data is set to that limit. The modified data is then returned to the model. This makes the bypass tool useful for providing fault tolerant actions when the model is executing in real-time. Another use of the bypass tool is in the area of debugging a simulation, when incorrect values are seen they can be altered enabling the simulation to continue without having to shut down. The remote auxiliary tool can include different types of generator tools such as, sine wave, square wave, pulse, or any arbitrary user created functions that produce data for the model. One of ordinary skill in the art will appreciate that the present invention is not limited to using the event-listener API to non-intrusively and synchronously connect the remote auxiliary tool(s) to the model.

In addition, the displays of the remote auxiliary tool, if required, are provided separate from the graphical model 10, thus keeping with the non-intrusive feature of this invention. Likewise, a GUI can be provided with a multiple-document interface type of layout in which a master GUI contains one or more visual display device windows with additional interfaces for managing the connections to the model corresponding to each remote tool.

Figure 3:
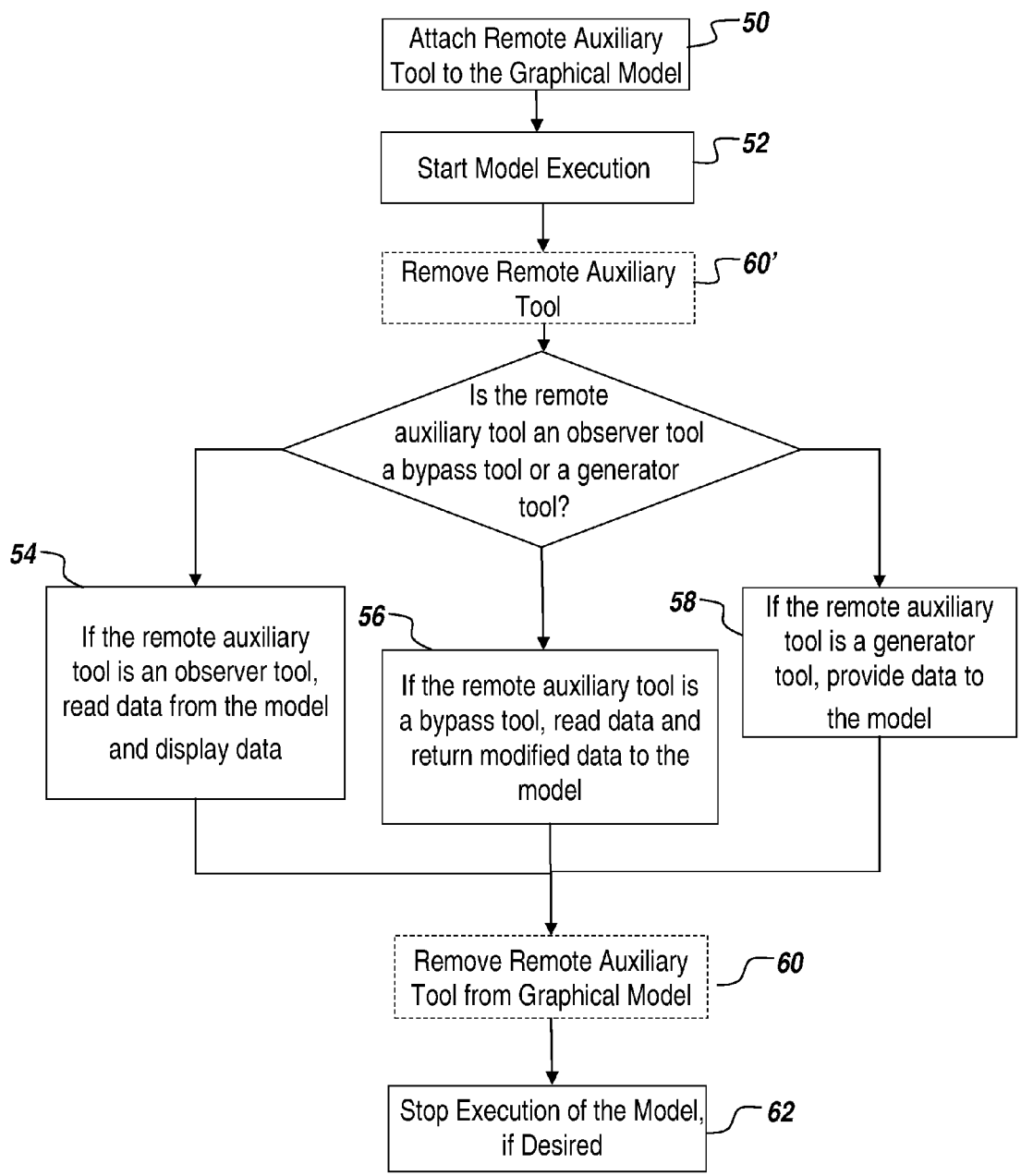
FIG. 3 is a diagrammatic illustration of a method of use of the tool, in accordance with embodiments of the present invention.

Several example embodiments of implementations of the remote auxiliary tool in accordance with the present invention are described herein. In addition, FIG. 3 is a diagrammatic illustration of a method of using the remote auxiliary tool realized using the event-listener API. In accordance with one example embodiment of the present invention, a user can attach a remote auxiliary tool to a model to listen to specific events before, during, or after model execution (step 50). The user can detach a remote auxiliary tool before, during, or after graphical model (10) execution (steps 60 and 60'). Connections to the model (10) by the remote auxiliary tool are maintained while the model is not running. When the model is not running, the user can edit the model and possibly change it structure. If the act of editing the model deletes an object such as a block (11) or line (13) that is connected to a remote auxiliary tool, the tool becomes disconnected from the model.

The user can start the model execution (step 52). During model execution model and block methods are invoked. With in Simulink® this consists of a simulation loop. Each computational block in Simulink® consists of multiple run-time methods that are executed within the simulation loop. Simulink® decomposes block methods by type and executes them in a predefined manner from model models that are invoked by the simulation loop. During execution of a model or block method, if a block with registered listeners is encountered, the model sends an event causing the respective listener (steps 54, 56, and 58) of the remote auxiliary tool to execute. The listener of the remote auxiliary tool can be an observer tool reading and displaying data (step 54), a bypass tool reading data and returning modified data (step 56), or a generator tool providing data (step 58). When execution completes, the model returns to the not running state (step 62).

One of ordinary skill in the art will appreciate that, as mentioned previously, the distinction between observation or observer tool, bypass tool, and generator tool as outlined above is done merely to convey different aspects of the invention clearly. However, the present invention does not require that the tool fall completely within one or the other of the observation or observer tool, bypass tool, or generator tool categories. Rather, the tool can be a hybrid mixture of the three forms or varieties of tool. Furthermore, it should be noted that the remote auxiliary tool is formed of at least one tool, such that the specific configuration of each tool forming the remote auxiliary tool becomes less relevant to the operation of the remote auxiliary tool, because the same functionality of the remote auxiliary tool can be implemented with numerous variations of observation, bypass, or generator, and number of tools forming the remote auxiliary tool. Accordingly, the present invention is not limited to the specific example embodiments of tools described herein. Rather, the remote auxiliary tool of the present invention is formed of a combination or mixture of the different variations possible with the tool operational characteristics, in addition to a combination of multiple tools having the same or different operational characteristics.

Figure 4A:
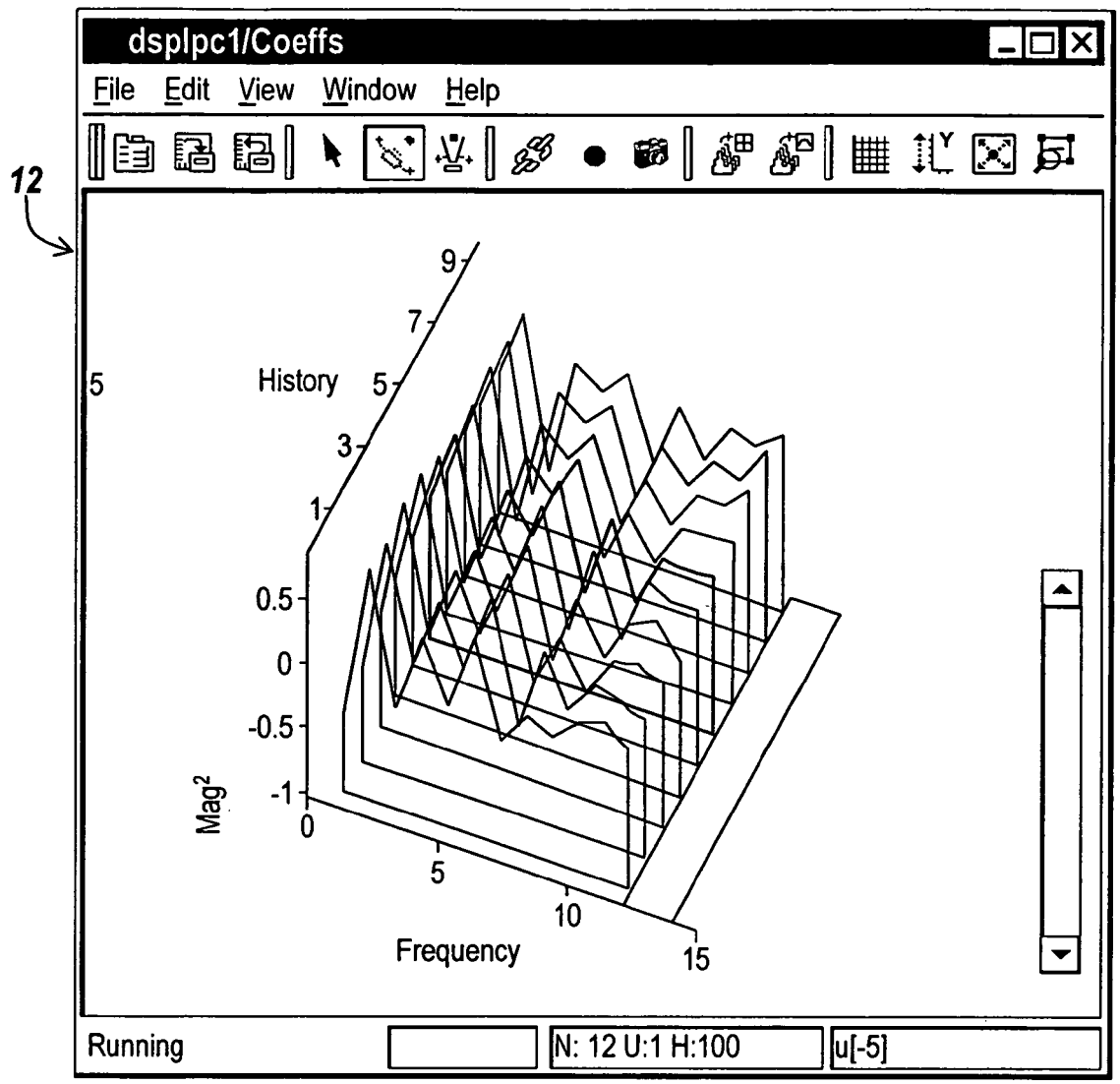
FIG. 4A is a screen depiction of an example tool, according to one aspect of the present invention.
Figure 4B:
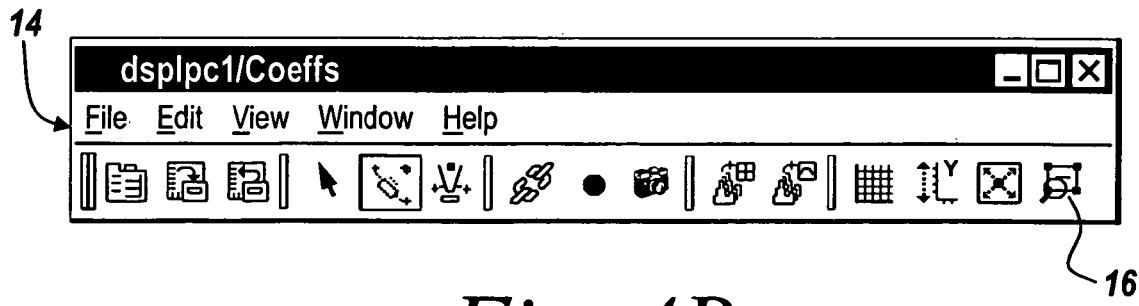
FIG. 4B is a screen depiction of the toolbar of the example tool of FIG. 3A.

One example implementation of the remote auxiliary tool of the present invention is shown in FIG. 4A and FIG. 4B. FIG. 4A is a screen depiction of a tool resulting from a user implementing the remote auxiliary tool. The remote auxiliary tool is implemented as a waterfall plot 12. The waterfall plot 12 is a visual display of data virtually connected to the graphical model 10 at point A. The remote auxiliary tool can include a number of different interfacing options, some of which can be implemented in a toolbar configuration. For example, FIG. 4B shows a toolbar 14 having a number of standard buttons. One of ordinary skill in the art will recognize several of the symbols representing the functions of the buttons. One example button that can be utilized in conjunction with the present invention is a highlight button 16, which when clicked on will highlight the signal in the graphical model 10 being displayed by the remote auxiliary tool, such as the waterfall plot 12. One of ordinary skill in the art will appreciate that a number of different functions can be implemented in the remote auxiliary tool of the present invention in accordance with particular function or operation of the remote auxiliary tool.

In addition, the remote auxiliary tool interface in a particular embodiment can vary. For example, in FIG. 5, the remote auxiliary tool is implemented as a multiple document interface (MDI) style GUI design, incorporating multiple display devices in a single master window 18. In this example, there are connections established for each display corresponding to signals originating from multiple graphical models 10. A first display 20 reports data from a first graphical model. A second display 22 reports data from a second graphical model. A third display 24, a fourth display 26, and a fifth display 28 all report data from a third graphical model. The remote auxiliary tool is formed of the collection of the displays 20, 22, 24, 26, and 28. Each of the displays operates independently and pulls data from different model locations. The displays can pull data from the same model location if desired. Furthermore, as mentioned previously, each of the collection of the displays 20, 22, 24, 26, and 28 forming the remote auxiliary tool can be individually or collectively attached or detached from the graphical models before, during, or after the graphical models are implemented.

Figure 5:
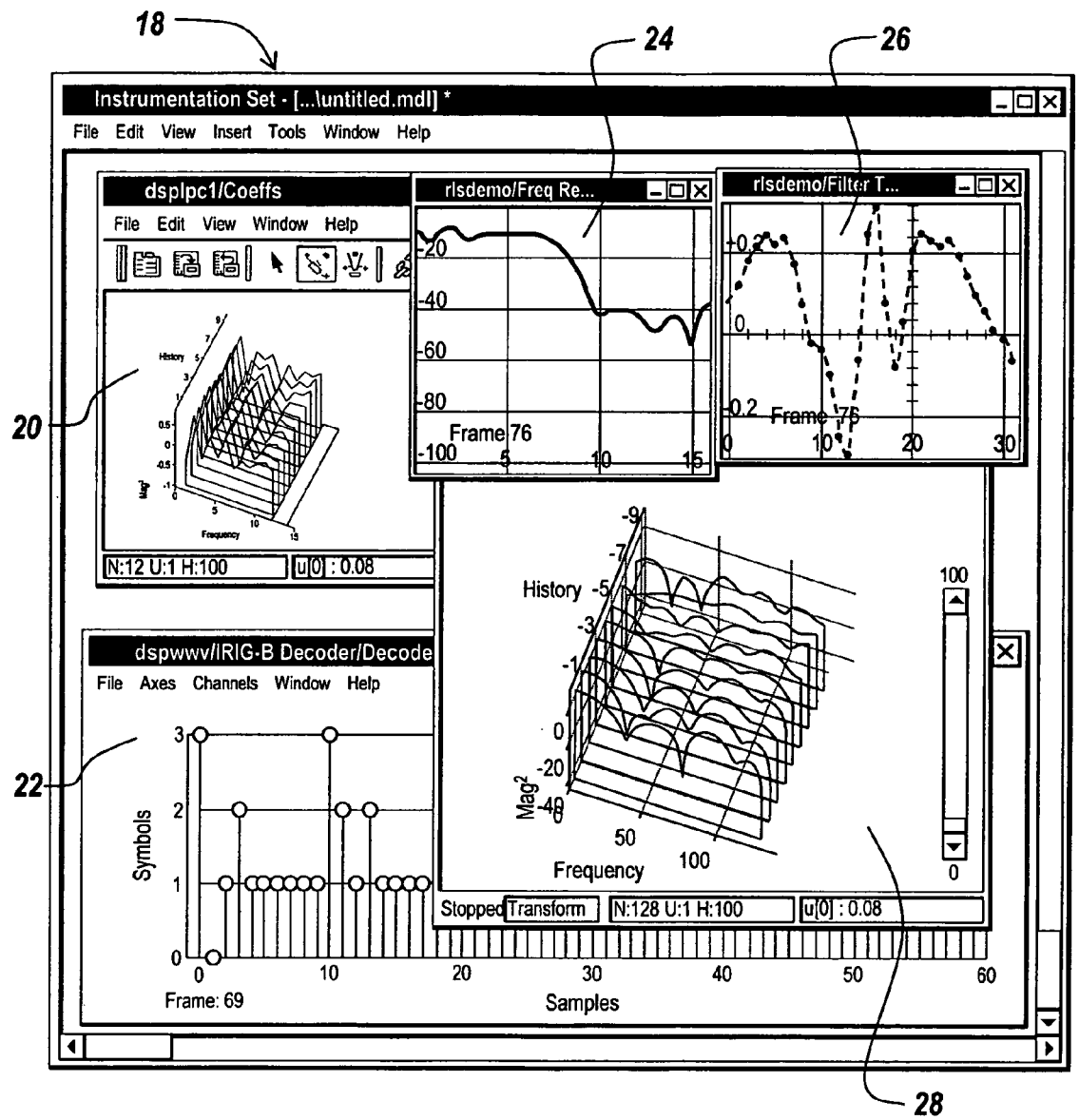
FIG. 5 is a screen depiction of multiple tools, according to one aspect of the present invention.
Figure 6:
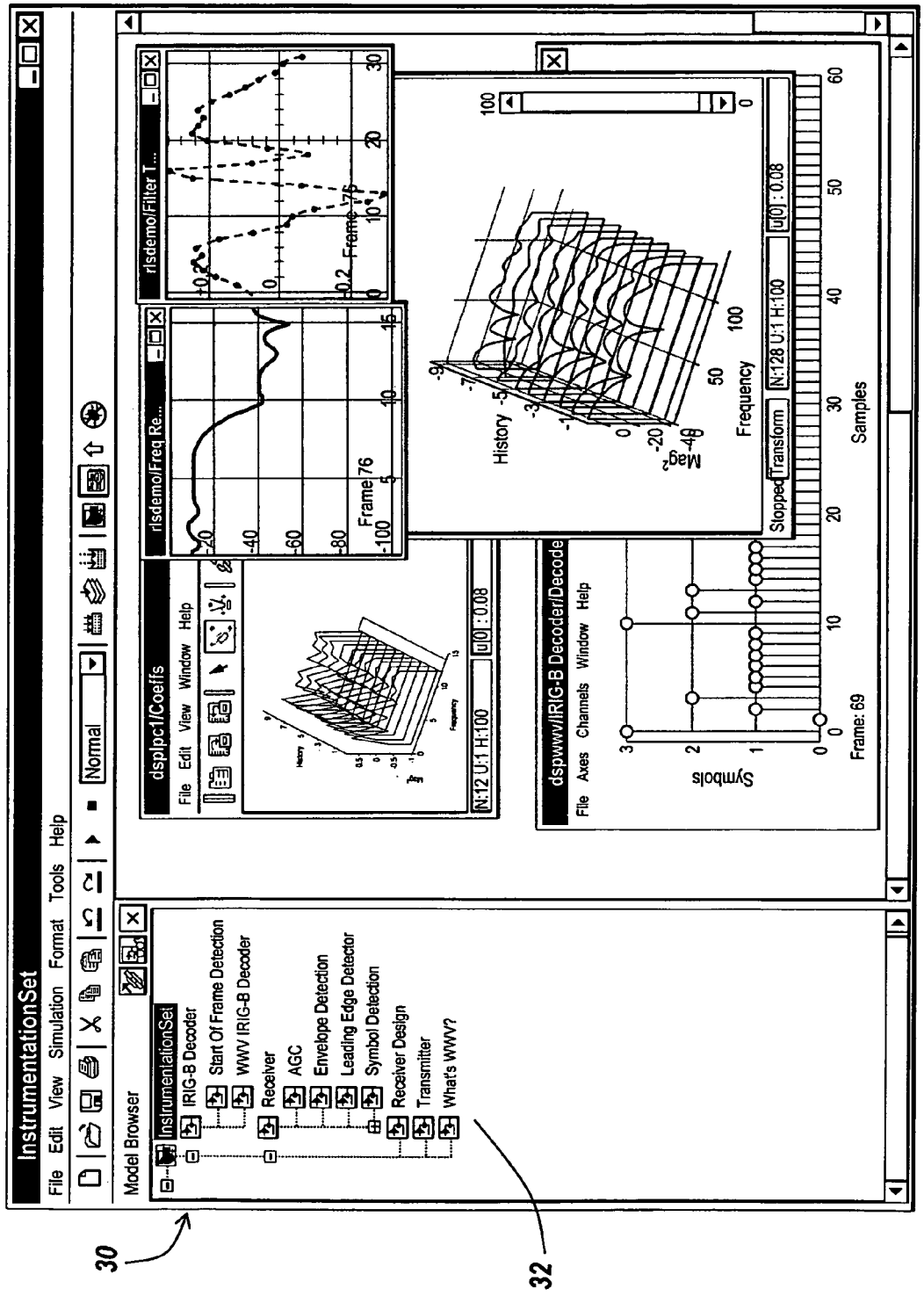
FIG. 6 is a screen depiction of multiple tools, according to one aspect of the present invention.

FIG. 6 is another screen depiction of an MDI GUI 30 with a pre-loaded collection of displays forming the remote auxiliary tool, such as those illustrated in FIG. 5. In addition, the remote auxiliary tool in this example embodiment includes a remote connection manager 32. The remote connection manager 32 provides an organized GUI that enables a user to track and select different elements making up the remote auxiliary tool. One of ordinary skill in the art will appreciate that the example remote connection manager 32 is shown as a tree structure. However, any number of file organization techniques and configurations can be utilized to generate the remote connection manager 32, such that the manager 32 is not limited to the specific embodiment illustrated.

As described, the remote auxiliary tool includes at least one tool. The remote auxiliary tool is attached to the model in the graphical modeling environment prior to execution, during execution, and/or after execution of a model. The remote auxiliary tool is detachable from the model during execution of the model in the graphical modeling environment.

The illustrative embodiments have been primarily described with regard to their observation functionality. The observation tool non-invasively collects data after attachment to the model 10. The observation tool likewise can non-invasively register interest in data or some event of the graphical model 10. The registration of the data or event can be displayed in accordance with the examples illustrated herein. In addition, the remote auxiliary tool can initiate an action upon registration of a predetermined characteristic of the data or event observed. For example, if a predetermined data point, such as a maximum or a minimum, is achieved in a graphical model as it is running, the remote auxiliary tool can register the occurrence and forward instructions or implement other actions to address the occurrence. Such actions may include pausing the model execution, forwarding data relating to other points in the model at the time of the occurrence, sending a message to the user, implementing a change in the operation of a separate model and/or hardware device, and the like.

The implementation of the remote auxiliary tool can be in the form of a non-blocking tool if its primary purpose is one of registration, recordation, or observation. In this mode, the model that is executing does not wait for the attached remote auxiliary tool to finish responding to a particular execution event. The remote auxiliary tool can likewise be implemented in the form of a blocking tool if its purpose is to influence model execution. In this mode, the model to which the remote auxiliary tool is attached waits until the tool has generated an action in response to receipt an execution event. Such actions could include pausing the model execution, or other actions that affect the model or the execution or operation of the model or devices connected with the model and operated by the model, occur based on observations made by the remote auxiliary tool.

The display or GUI for a bypass tool forming part or all of the remote auxiliary tool can be substantially the same or similar to that of the GUIs shown herein in FIGS. 4A, 4B, 5, and 6. The bypass type of tool has the ability to read data from the graphic model 10 as it is running and halt the model, or modify the data and return a different value to the model or other locations, in accordance with predetermined configurations. Thus, the bypass tool accesses and modifies data and/or event of the model, and can return a modified form of the data and/or event. In addition, it should be noted that the bypass tool can modify a data and/or event of the model using block diagram primitives and/or textual language primitives. The data pulled from the graphical model 10 can also be forwarded to a location separate from the running model, for example, a separate model, database, or hardware or software device.

It should further be noted that the observation tool, the bypass tool, and the generator tool described herein as example tools that can form the remote auxiliary tool can individually or in combination form the remote auxiliary tool. Thus, a single remote auxiliary tool can have all three functionalities as well as invasively modify or effect the operation of the graphical model 10.

The remote auxiliary tool configurations can be saved in the graphical model, or can be saved separate from the graphical model. In addition, one of ordinary skill in the art will appreciate that a reference or other identifier to a specific remote auxiliary tool can likewise be stored within the graphical model or separate from the graphical model being viewed or manipulated by the remote auxiliary tool. Furthermore, the selection of blocks, signals, or ports to be interfaced with the remote auxiliary tool can be performed using any available interface mechanism, including graphically, textually, data, and can be implemented through in-direct or direct connection to other software or hardware, and the like, in addition to user interface.

In the embodiments presented herein, the remote auxiliary tool configurations consist of the various attributes of the observer tool, bypass tool, and/or generator tools the user has created. Each of these tools can be connected to the model using an object selector. The object selector is one component of the remote auxiliary tool that associates each tool the user has created with objects (e.g. blocks, signals, or ports) in the model. For example, the selection of model objects (blocks, signals, or ports) to be connected to a remote auxiliary tool can be done using a signal selector that displays the model hierarchy in a textual fashion. The user navigates to the desired object in the textual hierarchy and connects the tool the object. Alternatively, the user can select an object in the model and then click a button in the signal selector to attach the remote auxiliary tool to the selected object.

Figure 7:
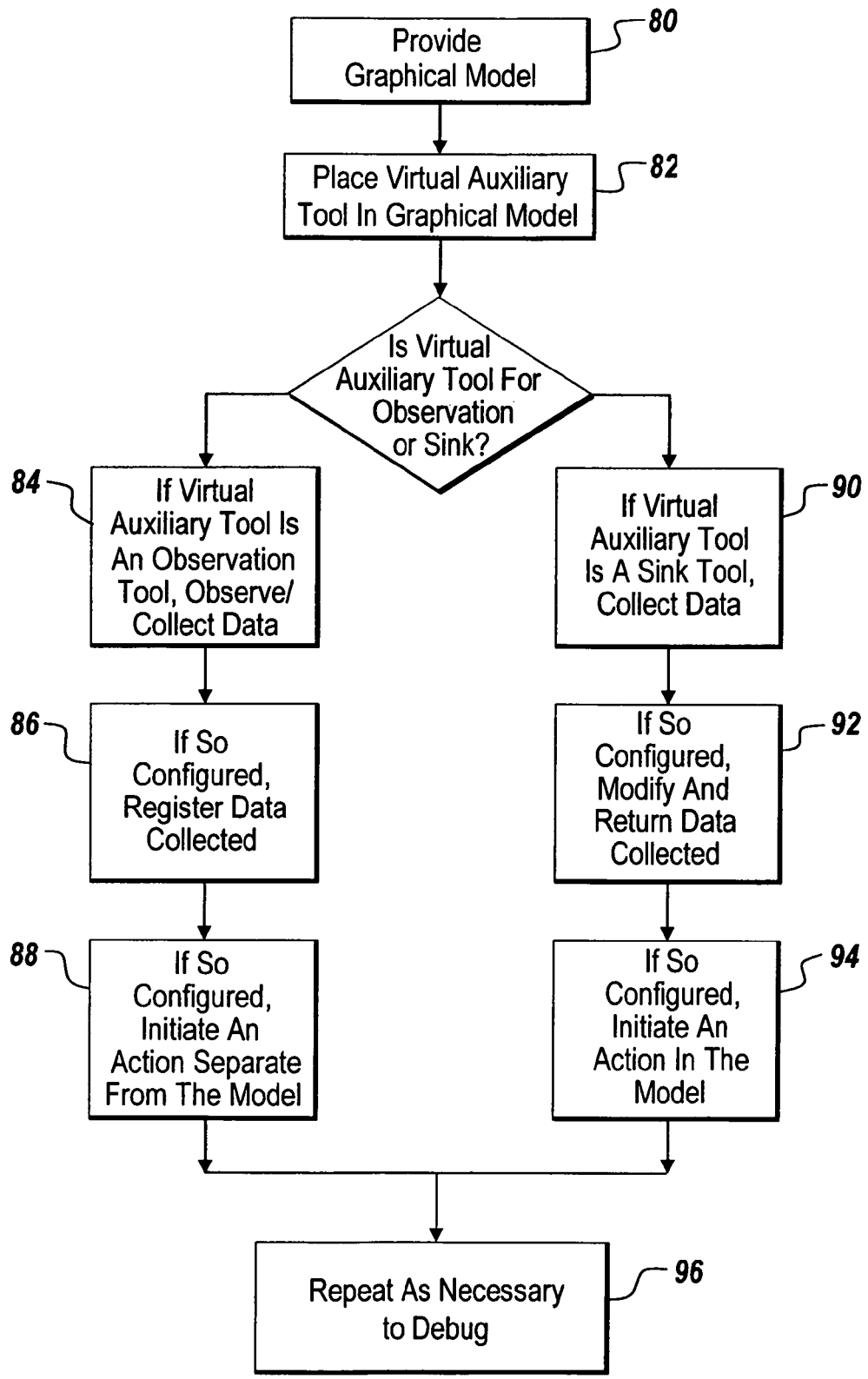
FIG. 7 is a flowchart illustrating an example method of use of the tool, in accordance with embodiments of the present invention.

It should be noted that one useful implementation of the remote auxiliary tool of the present invention is in the performance of debugging of a system being modeled using the graphical model 10, as shown in FIG. 7. To debug an operating model, the model is first provided (step 80). The user implements an instance of the remote auxiliary tool (step 82). At this point, the particular type of remote auxiliary tool can influence the next steps. If the remote auxiliary tool is an observation type of tool, the user attaches the remote auxiliary tool at a point in the model at which access to data is desired to observer or collect data (step 84). If desired, the data collected can be registered (step 86). If configured accordingly, the remote auxiliary tool can initiate an action separate or removed from the graphical model (step 88), while still maintaining its non-invasive characteristics in the graphical model.

If, on the other hand, the remote auxiliary tool is of a bypass type, data can be collected, and/or modified, and/or overridden, in accordance with the configuration of the remote auxiliary tool. The remote auxiliary tool collects the data (step 90). The user can take information or data learned by use of the remote auxiliary tool and implement actions to affect how the model is operating in an effort to debug the simulation or the model of the dynamic system (step 92). These actions can include using the bypass type of remote auxiliary tool to change signal values at different locations in the model. In addition, different actions can be initiated in the graphical model in an effort to debug the model (step 94). The steps can be repeated as necessary to debug the model (step 96).

Figure 8:
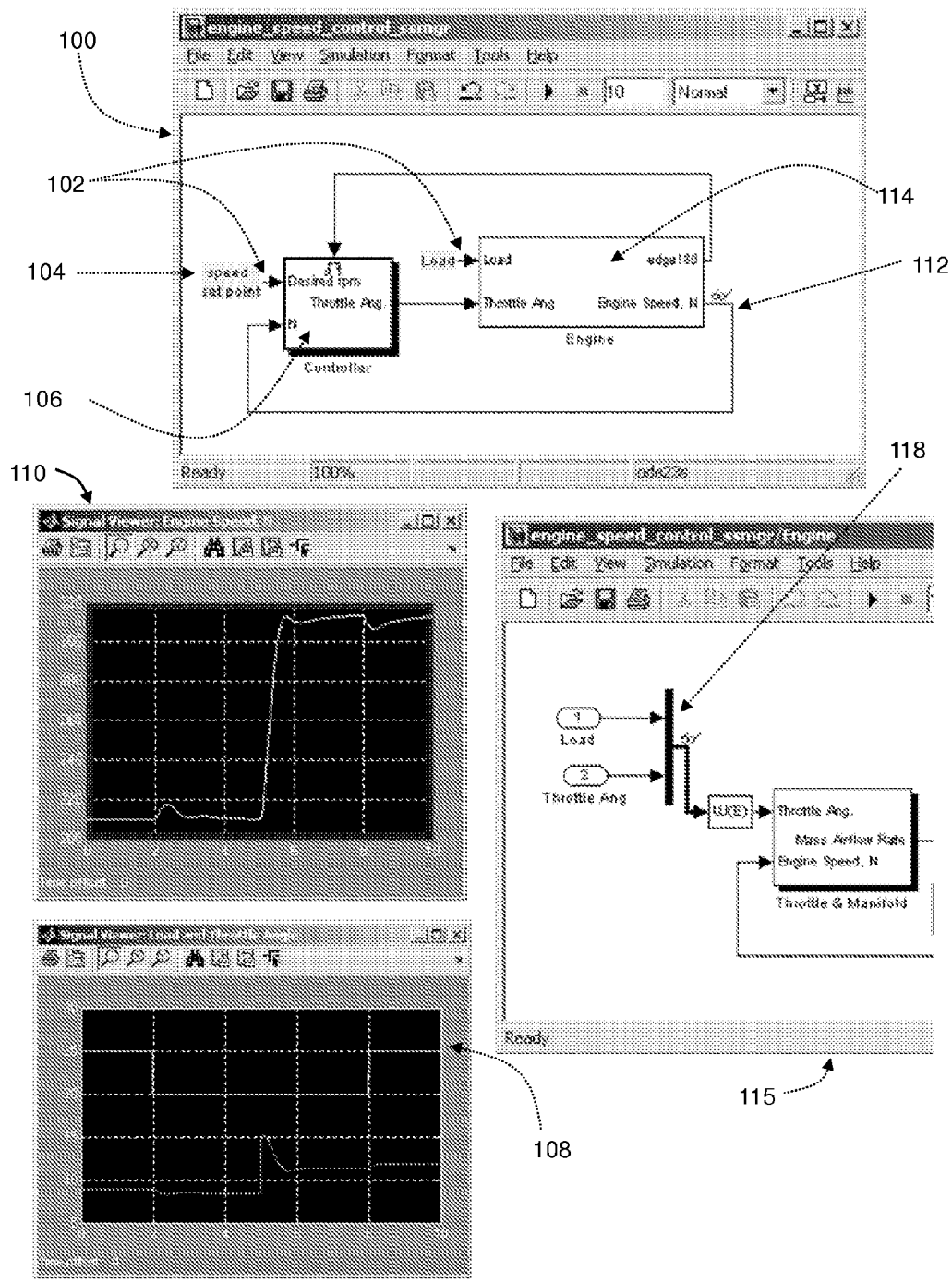
FIG. 8 is a screen depiction of two generator tools and two observer (viewer) tools connected to a model.

The remote auxiliary tool can also be a generator tool. The generator tool provides data to a model, such as a running model 100 in FIG. 8. This can be in the form of a signal 102 without a source block icon. In FIG. 8, the "speed set point" 104 and "Load" represent text indicating two injection points. Without a signal provided by a remote auxiliary tool, the model would treat these two signals as unconnected and provide a value of 0 to the first input port of the Controller 106 block. It should be noted, that the notion of an unconnected signal identified by an injection point in model 100 is text, but it could be a generic graphical symbol such as a circle with a dot in the center. In this example, a generator tool is supplying a set point that has trajectory 108 for the Load injection point. FIG. 8, also includes two observer tools, 110 a scope that is connected to the second output 112 of the Engine 114 block and 116 a scope that is connected to the Mux 118 block output in the Engine Subsystem 115 corresponding to the Engine 114 block.

Figure 9:
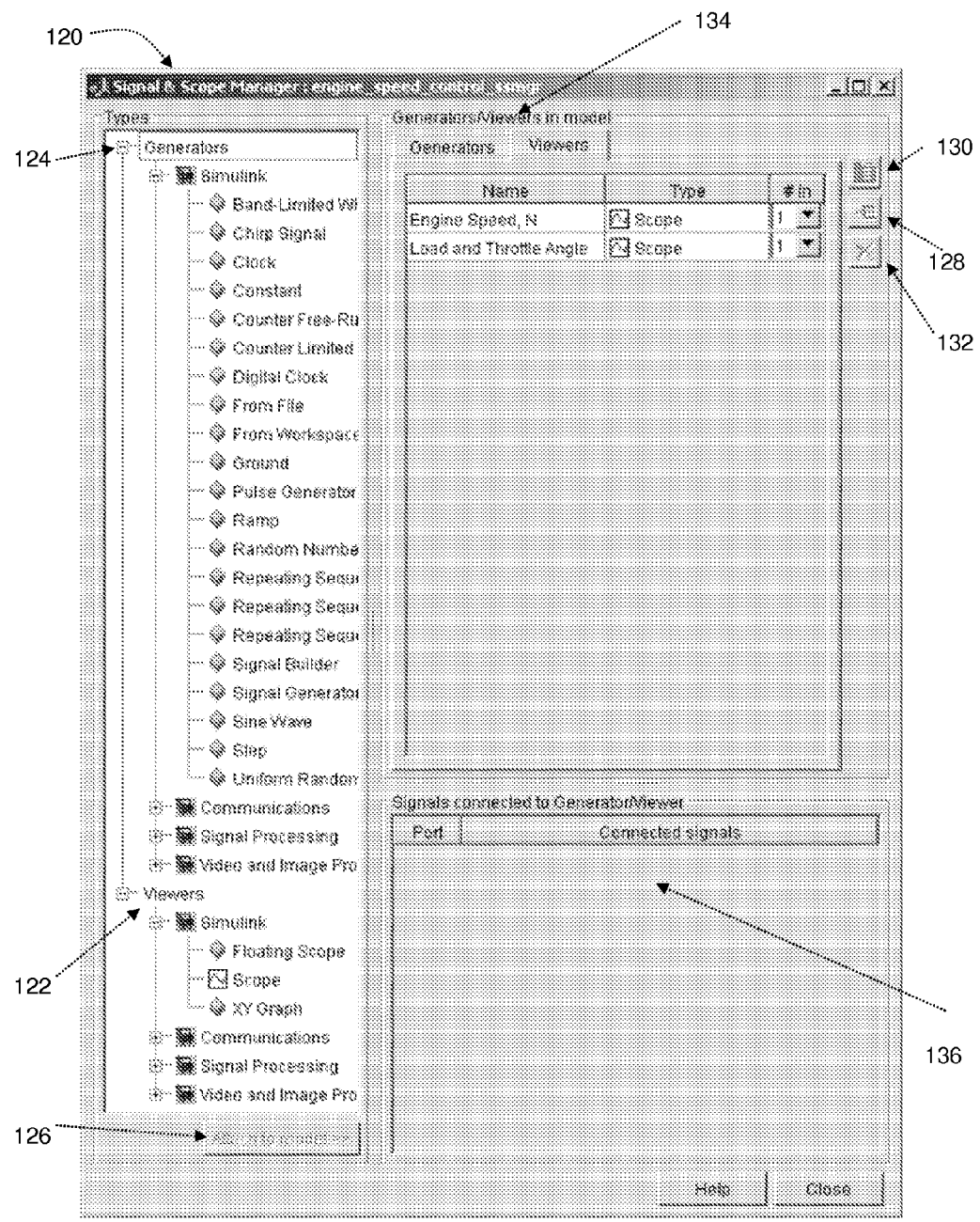
FIG. 9 is a screen depiction of a signal and scope manager used to manage remote generator and observer (viewer) tools.

FIG. 8 further illustrates the non-intrusive, but synchronized aspect of the present invention, where the user does not have to explicitly select blocks or other graphical objects from a library and add them to the model, then make the connections using signals. The signal and scope manager 120, is shown in FIG. 9, which is responsible for managing the observer tools 122 (here they are all display tools and thus are referred to as viewers) and generator tools 124. To use the signal and scope manager to attach generators to signals, one selects a generator from the generators tree view 124 and clicks an "Attach to model >>" button 126, which enables after the generator has been selected. After the generator is attached, one can use a signal selector 140 of FIG. 10, which can be activated by selector button 128 to complete the attachment by connecting the generator to an injection point which is an unconnected input port or signal of the model. Similarly, to connect an observer tool 122 to the model, one selects the desired viewer display to use and then clicks "Attach to model >>" button 126 to attach the generator to the model. For either the observer tool 122 or generator tool 124, one can detach either by selecting the tool in a generator/viewer panel 134 and then remove the tool can be removed using a delete button 132 or its properties such as the X and Y limits of a display or the amplitude of a sine wave generator using a properties button 130. When an observer (viewer) or generator is selected in the generator/viewer panel 134, its connections are shown in a connection panel 136.

Figure 10:
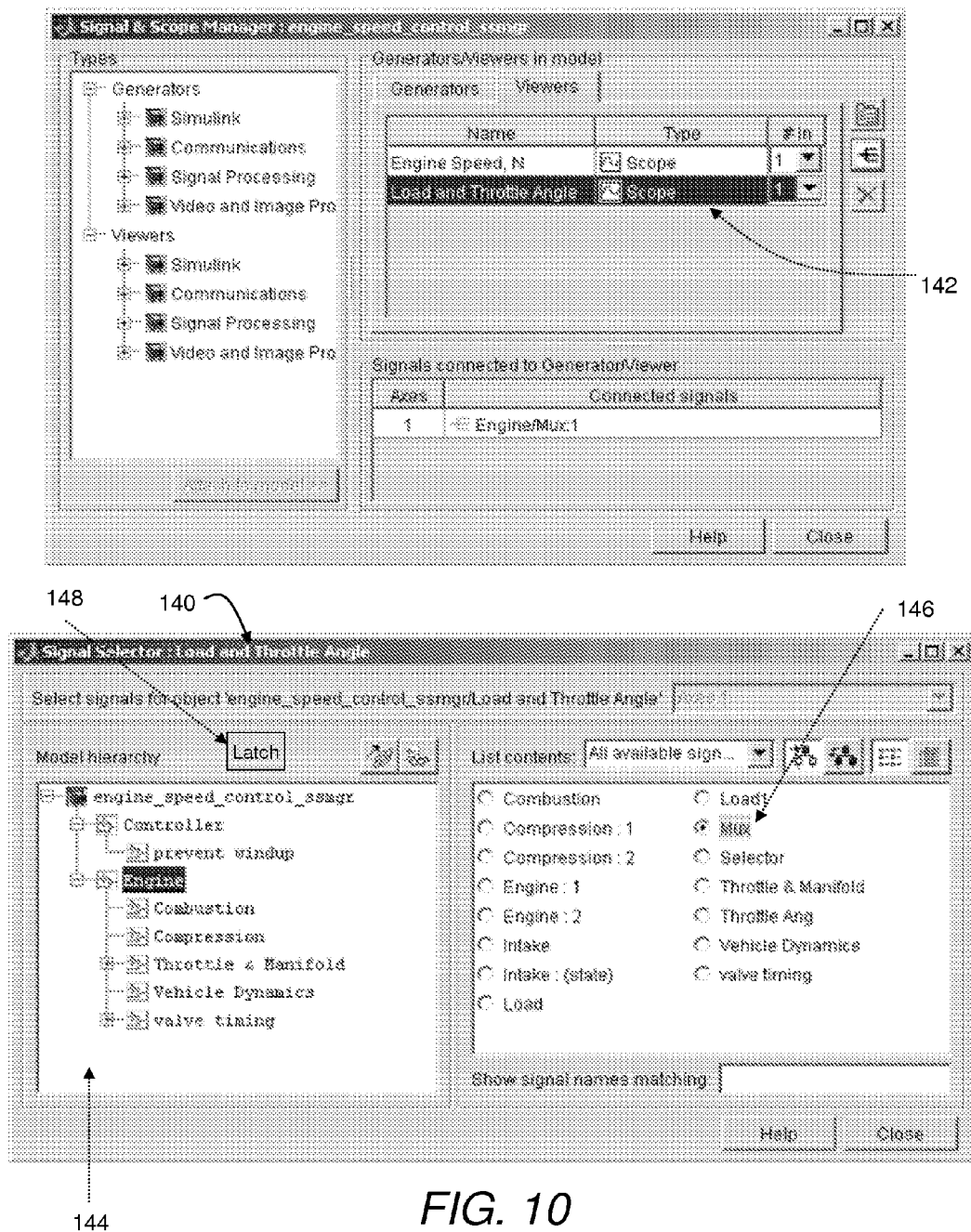
FIG. 10 is a screen depiction of a signal selector that is used to connect remote generator and observer (viewer) tools to a model.
Figure 11:
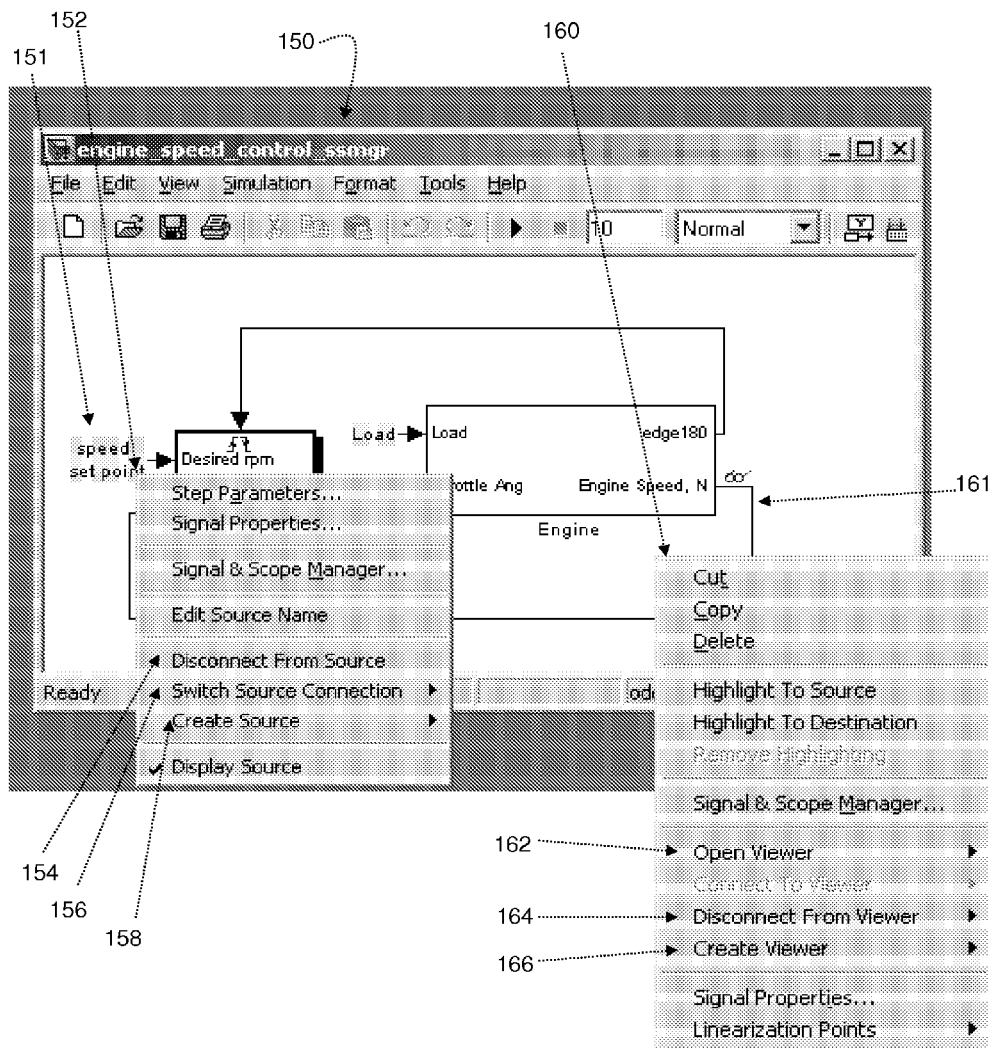
FIG. 11 is a screen depiction of context sensitive menus used to connect remote generator and observer (view) tools to a model.

FIG. 10 illustrates a signal selector 140 that is used to finalize the connection of an observer (viewer) or generator to the model 100. In FIG. 10, a scope has been selected for a "Load and Throttle Angle" viewer observer tool 142 and then the signal selector 140 was used to navigate the model hierarchy using a tree view 144 to the engine subsystem. Within the engine subsystem, the scope has then been connected to a Mux output signal 146. Alternatively, one could use a latch button 148 to connect the tool to the signal selected at that time. In particular, if the signal connected to the Mux 118 block output port is selected, and one clicks the latch button 148, then the signal selector 140 automatically navigates to the Mux block 118 output port signal 146 and establishes the signal connection.

One skilled in the art will recognize that there are several ways to attach observer tools, bypass tools, and generator tools to a model 10, 100. Revisiting model 100, shown again in FIG. 11 as model 150, an alternative embodiment of the present invention can be used to connect or disconnect remote auxiliary tools from the model 150. In particular in the example embodiment, the user can use a context sensitive menu 152 of FIG. 11 to attach and remove generators to unconnected input ports or signal injection points 151. The context sensitive menu 152 can be brought up by right-clicking on an injection point 151. Within the context sensitive menu 152, one can disconnect from a generator source using a disconnect selection 154, and reconnect to another generator source using a switch connection selection 156, or create and connect a new generator source using a create source selection 158. Similarly, one can bring up the context sensitive menu for a signal 160 by right-clicking on a signal, such as signal 161, which is the engine speed, the second output of the engine block. Within the context sensitive menu one can open a viewer that is connected to the signal using an open viewer selection 162 (note multiple viewers can be connected to one signal), disconnect one or all of the viewers connected to the signal using a disconnect selection 164, or create and connect a new viewer using a create view selection 166.

When executing the model using an interpretive engine, the event-listener paradigm provides a straight forward means by which to support the remote auxiliary tool. However, one skilled in the art recognizes that a model can be translated to generated code, where the generated code can be a high-level programming language such as C, Java, or C++ or assembly code. To support the adding and removing of remote auxiliary tools during execution, the generated code can be instrumented before and after each block method. Alternatively, a run-time engine can be created which, using the executable created after compiling and linking the code, can instrument the executable with entry points before and after the code for each model and block method, thus enabling one to implement the event-listener architecture enabling the removal and addition of remote auxiliary tools during model execution.

An alternative to the event-listener paradigm for synchronously connecting the remote auxiliary tool to the model is to aggregate the model objects and the remote auxiliary tool(s) into one execution engine. This can be done when the connections to the model are made prior to model execution and are not altered during execution. In this scenario, one can use model primitives, e.g. a sine wave signal generator or a scope display block to define a generator or observer tool respectively. The remote auxiliary tool is not added to the graphical definition of the model; rather, an internal aggregated representation of the model is formed consisting of both the model objects plus the remote auxiliary tools. After this is done, an internal execution structure can be created by translating the model into executable operations or generated code. If the connections are altered during execution, it is necessary to know a priori the full range of alterations that may be performed. Otherwise, dynamic alteration of the execution structure needs to occur and dynamic alteration of the execution structure is very similar to the event-listener paradigm.

The remote auxiliary tool provides freedom to tap into an existing and executing model at any time and collect data, modify data, start and stop the model execution, return desired constants or other forms of modified data to the model execution, influence the operation of separate models or devices, and the like. Accordingly, a user attempting to diagnose or debug a model of a dynamic system can use the remote auxiliary tool of the present invention to both take contemporaneous or real time readings of signal values within the graphical model and/or communicatively associated devices, and if desired, make changes or modifications to the data to effect a desired outcome for diagnostic and/or control purposes. One of ordinary skill in the art will appreciate that debugging is an iterative process that can be implemented in a number of different ways, such that the present invention is not limited to the specific example of debugging described herein. Rather, the present invention and corresponding method of use can vary in accordance with preferred debugging processes.

Accordingly, the present invention is generally directed to a remote auxiliary tool and corresponding method of use. The remote auxiliary tool is formed of at least one observer tool, bypass tool, or generator tool. The tool is non-intrusive, meaning there are no explicit modeling primitives (e.g. blocks or lines) added to the graphical model. Thus, there is no requirement that the tool be programmed into the model when the model is being created. The remote auxiliary tool is furthermore remote and auxiliary in nature, meaning that it is separate from the graphical model. The remote auxiliary tool is likewise representative of a variety of different tools, limited only by the functionality that can be provide by an tool that forms the remote auxiliary tool. The remote auxiliary tool can be connected to the graphical modeling environment prior to execution, during execution, or after execution of a model, and is also detachable from the model during execution of the model in the graphical modeling environment. The remote auxiliary tool can be implemented to influence only the graphical modeling environment, and/or can initiate actions that affect the operation of separate software applications or hardware devices.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. It is intended that the present invention be limited only to the extent required by the appended claims and the applicable rules of law.

The invention claimed is:

1. A method comprising:
   non-intrusively attaching a remote auxiliary tool to a graphical model in a graphical modeling environment,
   the non-intrusively attaching the remote auxiliary tool being performed by a computer,
   the graphical model comprising a plurality of graphical representations,
   the graphical model, when executed, simulating a behavior of a dynamic system;
   receiving, during an execution of the graphical model and based on attaching the remote auxiliary tool, first data related to an event associated with the graphical model, the receiving the first data being performed by the computer;

non-intrusively invoking, based on receiving the first data, the remote auxiliary tool during the execution of the graphical model in the graphical modeling environment,
the non-intrusively invoking the remote auxiliary tool being performed by the computer;
reading, using the remote auxiliary tool, second data at a first location in the graphical model,
the reading the second data being performed by the computer;
initiating, based on the second data, an action separate from the graphical model,
the initiating the action being performed by the computer;
modifying, based on initiating the action, the second data,
the modifying the second data being performed by the computer; and
providing, to a second location in the graphical model, the modified second data,
the second location being different from the first location,
the modified second data being used by the graphical model during the execution of the graphical model for simulating the behavior of the dynamic system, and
the providing the modified second data being performed by the computer.

2. The method of claim 1, further comprising:
receiving, during the execution of the graphical model, an input from a user; and
detaching, based on the input, the remote auxiliary tool from the graphical model during the execution of the graphical model.

3. The method of claim 1, where attaching the remote auxiliary tool includes:
attaching the remote auxiliary tool to the graphical model during the execution of the graphical model,
where attaching the remote auxiliary tool causes the remote auxiliary tool to register an interest in a graphical representation, of the plurality of graphical representations, associated with the first location.

4. The method of claim 1, where the plurality of graphical representations includes a textual object, the method further comprising:
receiving a selection of the textual object; and
where attaching the remote auxiliary tool includes:
attaching, based on the selection, the remote auxiliary tool to the graphical model.

5. The method of claim 1, where the plurality of graphical representations includes at least one of a block or a signal line, and
where attaching the remote auxiliary tool includes:
attaching the remote auxiliary tool to the at least one of the block or the signal line included in the plurality of graphical representations.

6. The method of claim 1, where the plurality of graphical representations includes a graphical object, the method further comprising:
receiving a selection of the graphical object; and
where attaching the remote auxiliary tool includes:
attaching, based on the selection, the remote auxiliary tool to the graphical model.

7. The method of claim 6, where the remote auxiliary tool attaches to one of a block or a signal line included in the plurality of graphical representations.

8. The method of claim 1, further comprising:
displaying an indicator representing the remote auxiliary tool attached to the graphical model.

9. The method of claim 1, where the remote auxiliary tool provides the input data to the graphical model using block-diagram primitives.

10. The method of claim 1, where the remote auxiliary tool provides the modified second data to the second location in the graphical model using textual-programming primitives.

11. The method of claim 1, where the remote auxiliary tool attaches to the graphical model based on block-diagram execution events after an occurrence of a condition.

12. The method of claim 1, where the graphical modeling environment supports time-based block-diagram semantics.

13. The method of claim 1, where the graphical modeling environment supports state transition diagramming semantics.

14. The method of claim 1, wherein the graphical modeling environment supports dataflow block-diagram semantics.

15. The method of claim 1, further comprising:
annotating the graphical model using an indicator to reflect that the remote auxiliary tool has been attached to one or more of the plurality of graphical representations.

16. The method of claim 1, further comprising:
receiving, via a selection tool of the remote auxiliary tool, information identifying an attachment location for the remote auxiliary tool; and
where non-intrusively attaching the remote auxiliary tool includes:
registering an interest in a graphical representation, of the plurality of graphical representations, associated with the attachment location.

17. The method of claim 1, where the remote auxiliary tool comprises a set of multiple remote auxiliary tools.

18. The method of claim 17, where non-intrusively invoking the remote auxiliary tool includes:
providing at least one remote auxiliary tool, of the set of multiple remote auxiliary tools, using block-diagram primitives;
and
invoking the at least one remote auxiliary tool synchronously with model events during the execution of the graphical model.

19. The method of claim 1, where the remote auxiliary tool is implemented as a set of callbacks and the graphical model includes a block diagram model, and
where non-intrusively invoking the remote auxiliary tool includes:
invoking the set of callbacks synchronously with block-diagram execution events during an execution of the block diagram model.

20. The method of claim 1, where the second data includes one or more of:
a block parameter value,
a signal value, or
information identifying a state of the graphical model.

21. A device comprising:
a storage device to:
store at least one implementation tool for implementing a remote auxiliary tool; and
a processor to:
attach the remote auxiliary tool non-intrusively to a graphical model in a graphical modeling environment,
the graphical model comprising a plurality of graphical representations, and
the graphical model, when executed, simulating a behavior of a dynamic system,
receive, during an execution of the graphical model and based on attaching the remote auxiliary tool, first data, the first data being associated with an event associated with the graphical model,
invoke, based on receiving the first data, the remote auxiliary tool during the execution of the graphical model in the graphical modeling environment,
read, using the remote auxiliary tool, second data at a first location in the graphical model,
initiate, based on reading the second data, an action separate from the graphical model,
modify, based on initiating the action, the second data, and
provide the modified second data to the graphical model at one or more injection points of the graphical model while the graphical model is executing,
the one or more injection points being different from the first location, and
the modified second data being used by the graphical model during the execution of the graphical model.

22. The device of claim 21, where the processor is further to:
determine that one of the plurality of graphical representations has been removed from the graphical model, and
detach, based on the one of the plurality of graphical representations having been removed from the graphical model, the remote auxiliary tool from the graphical model.

23. The device of claim 21, where the remote auxiliary tool attaches to the graphical model during the execution of the graphical model.

24. The device of claim 21, where the plurality of graphical representations includes a textual object,
where the processor is further to:
receive a selection of the textual object, and
where, when attaching the remote auxiliary tool, the processor is to:
cause, based on the selection, the remote auxiliary tool to register an interest in the textual object to attach the remote auxiliary tool to the graphical model.

25. The device of claim 21, where the plurality of graphical representations includes a block and a signal line, and
where the processor is further to:
receive a selection of at least one of the block or the signal line, and
where, when attaching the remote auxiliary tool, the processor is to:
attach the remote auxiliary tool to the at least one of the block and the signal line included in the plurality of graphical representations.

26. The device of claim 21, where, when attaching the remote auxiliary tool, the processor is to:
attach, using graphical object selection, the remote auxiliary tool to the graphical model.

27. The device of claim 26, where the remote auxiliary tool attaches to one of a block or a signal line included in the plurality of graphical representations.

28. The device of claim 21, where the processor is further to:
display an indicator on the graphical model,
the indicator indicating the remote auxiliary tool attached to the graphical model.

29. The device of claim 21, where the remote auxiliary tool provides the modified second data to the graphical model using block-diagram primitives.

30. The device of claim 21, where the remote auxiliary tool provides the modified second data to the graphical model using textual-programming primitives.

31. The device of claim 21, where the remote auxiliary tool attaches to the graphical model based on block-diagram execution events after an occurrence of a condition.

32. The device of claim 21, where the graphical modeling environment supports time-based block-diagram semantics.

33. The device of claim 21, where the graphical modeling environment supports state transition diagramming semantics.

34. The device of claim 21, where the graphical modeling environment supports dataflow block-diagram semantics.

35. The device of claim 21, where the processor is further to:
annotate the graphical model using an indicator to reflect that the remote auxiliary tool has been attached to one or more of the plurality of graphical representations.

36. The device of claim 21, where the processor is further to:
receive a selection of an attachment location for the remote auxiliary tool, and
where, attaching the remote auxiliary tool, the processor is to:
attach the remote auxiliary tool to the attachment location.

37. The device of claim 21, where the at least one implementation tool comprises a set of remote auxiliary tools.

38. The device of claim 21, where the processor is further to:
store configuration information associated with the remote auxiliary tool in the graphical model.

39. The device of claim 21, where the remote auxiliary tool is implemented as a set of callbacks,
where the graphical model includes a block diagram model, and
where, when invoking the remote auxiliary tool, the processor is to:
invoke the set of callbacks synchronously with block-diagram execution events during the execution of the block diagram model.

40. The device of claim 21, where the second data includes one or more of:
a block parameter value,
a signal value, or
information identifying a state of the graphical model.

41. A non-transitory computer-readable medium storing instructions, the instructions comprising:
one or more instructions that, when executed by at least one processor, cause the at least one processor to:
non-intrusively attach a remote auxiliary tool to a graphical model in a graphical modeling environment,
the graphical model comprising a plurality of graphical representations, and
the graphical model, when executed, simulating a behavior of a dynamic system;
receive, during an execution of the graphical model and based on attaching the remote auxiliary tool, first data related to an event associated with the graphical model,
non-intrusively invoke, based on receiving the first data, the remote auxiliary tool during the execution of the graphical model;
read, using the remote auxiliary tool, second data from a first location in the graphical model,
initiate, based on reading the second data, an action separate from the graphical model,
modify, based on initiating the action, the second data; and provide the modified second data to the graphical model at one or more injection points of the graphical model during the execution of the graphical model,
the one or more injection points being different from the first location, and
the modified second data being used by the graphical model during the execution of the graphical model.

42. The non-transitory computer-readable medium of claim 41, where the instructions further comprise:
one or more instructions that, when executed by the at least one processor, cause the at least one processor to:
determine that one of the plurality of graphical representations has been removed from the graphical model; and
detach, based on the one of the plurality of graphical representations having been removed from the graphical model, the remote auxiliary tool from the graphical model.

43. The non-transitory computer-readable medium of claim 41, where the remote auxiliary tool attaches to the graphical model during the execution of the graphical model.

44. The non-transitory computer-readable medium of claim 41, where the plurality of graphical representations includes a textual object, and
where the instructions further comprise:
one or more instructions that, when executed by the at least one processor, cause the at least one processor to:
receive a selection of the textual object; and
where the one or more instructions to attach the remote auxiliary tool include:
one or more instructions that, when executed by the at least one processor, cause the at least one processor to attach, based on the selection, the remote auxiliary tool to the first location in the graphical model.

45. The non-transitory computer-readable medium of claim 44, where the remote auxiliary tool attaches to one or more of a block or a signal line included in the plurality of graphical representations.

46. The non-transitory computer-readable medium of claim 41, where the plurality of graphical representations includes a graphical object, and
where the instructions further comprise:
one or more instructions that, when executed by the at least one processor, cause the at least one processor to:
receive a selection of the graphical object, and
where the one or more instructions to attach the remote auxiliary tool include:
one or more instructions that, when executed by the at least one processor, cause the at least one processor to attach, based on the selection, the remote auxiliary tool to the first location in the graphical model.

47. The non-transitory computer-readable medium of claim 46, where the graphical object includes one of a block or a signal line included in the plurality of graphical representations.

48. The non-transitory computer-readable medium of claim 41, where the instructions further comprise:
one or more instructions that, when executed by the at least one processor, cause the at least one processor to indicate an attachment of the remote auxiliary tool on the graphical model using an indicator.

49. The non-transitory computer-readable medium of claim 41, where the remote auxiliary tool provides the modified second data to the graphical model using block-diagram primitives.

50. The non-transitory computer-readable medium of claim 41, where the remote auxiliary tool provides the modified second data to the graphical model using textual-programming primitives.

51. The non-transitory computer-readable medium of claim 41, where the graphical model includes a block diagram model, and
where the remote auxiliary tool attaches to the block diagram model based on block-diagram execution events after an occurrence of a condition.

52. The non-transitory computer-readable medium of claim 41, where the graphical modeling environment supports time-based block-diagram semantics.

53. The non-transitory computer-readable medium of claim 41, where the graphical modeling environment supports state transition diagramming semantics.

54. The non-transitory computer-readable medium of claim 41, where the graphical modeling environment supports dataflow block-diagram semantics.

55. The non-transitory computer-readable medium of claim 41, where the instructions further comprise:
one or more instructions that, when executed by the at least one processor, cause the at least one processor to:
annotate the graphical model using an indicator to reflect that the remote auxiliary tool has been attached to one or more of the plurality of graphical representations.

56. The non-transitory computer-readable medium of claim 41, where the instructions further comprise:
one or more instructions that, when executed by the at least one processor, cause the at least one processor to:
receive, via a selection tool of the remote auxiliary tool, a selection of the first location for attaching the remote auxiliary tool to the graphical model; and
where the one or more instructions to attach the remote auxiliary tool include:
one or more instructions that, when executed by the at least one processor, cause the at least one processor to attach the remote auxiliary tool to the first location based on the selection.

57. The non-transitory computer-readable medium of claim 41, where the remote auxiliary tool comprises a set of remote auxiliary tools.

58. The non-transitory computer-readable medium of claim 57, where the instructions further comprise:
one or more instructions that, when executed by the at least one processor, cause the at least one processor to:
provide at least one remote auxiliary tool, of the set of remote auxiliary tools, using block-diagram primitives;
and
invoking the at least one remote auxiliary tool synchronously with model events.

59. The non-transitory computer-readable medium of claim 41, where the remote auxiliary tool is implemented as a set of callbacks and the graphical model includes a block diagram model, and
where the one or more instructions to non-intrusively invoke the remote auxiliary tool include:
one or more instructions that, when executed by the at least one processor, cause the at least one processor to invoke the set of callbacks synchronously with block-diagram execution events.

60. The non-transitory computer-readable medium of claim 41, where the second data includes one or more of:
a block parameter value,
a signal value, or
information identifying a state of the graphical model.

* * * * *